US011837868B2

(12) United States Patent
Meng et al.

(10) Patent No.: US 11,837,868 B2
(45) Date of Patent: Dec. 5, 2023

(54) PHOTOVOLTAIC SYSTEM AND LEAKAGE CURRENT CONTROL METHOD FOR PHOTOVOLTAIC SYSTEM

(71) Applicant: Huawei Digital Power Technologies Co., Ltd., Shenzhen (CN)

(72) Inventors: Xiaoqian Meng, Shanghai (CN); Haibin Guo, Shanghai (CN); Yongbing Gao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/704,120

(22) Filed: Mar. 25, 2022

(65) Prior Publication Data

US 2022/0311246 A1 Sep. 29, 2022

(30) Foreign Application Priority Data

Mar. 27, 2021 (CN) .......................... 202110329154.5

(51) Int. Cl.
*H02J 3/38* (2006.01)
*H02S 40/32* (2014.01)
*H02M 7/537* (2006.01)

(52) U.S. Cl.
CPC ............. *H02J 3/381* (2013.01); *H02M 7/537* (2013.01); *H02S 40/32* (2014.12); *H02J 2207/20* (2020.01); *H02J 2300/24* (2020.01)

(58) Field of Classification Search
CPC .... H02J 3/381; H02J 2207/20; H02J 2300/24; H02M 7/537; H02S 40/32; H02S 50/00
See application file for complete search history.

(56) References Cited

U.S. PATENT DOCUMENTS

| 2008/0272653 A1* | 11/2008 | Inoue ................. H02J 7/35 307/47 |
| 2011/0032734 A1* | 2/2011 | Melanson .............. H02J 3/381 363/37 |

(Continued)

FOREIGN PATENT DOCUMENTS

| CN | 103023364 A | 4/2013 |
| CN | 104158429 B | 4/2017 |

(Continued)

OTHER PUBLICATIONS

Lee et al.,"Modulation Technique to Reduce Leakage Current in Transformerless Photovoltaic Systems using a Three-Level Inverter", 2013, IEEE, 6 pages.

(Continued)

*Primary Examiner* — Daniel Kessie
*Assistant Examiner* — Brian K Baxter
(74) *Attorney, Agent, or Firm* — Maier & Maier, PLLC

(57) ABSTRACT

A photovoltaic system and a leakage current control method for the photovoltaic system includes at least one photovoltaic module group, at least one photovoltaic inverter, a grounded metal frame, and a sampling control unit. The photovoltaic module group is mounted on the grounded metal frame. An output end of the photovoltaic module group is connected to an input end of the photovoltaic inverter, and an output end of the photovoltaic inverter is connected to a power grid. The sampling control unit is coupled to both the photovoltaic module group and the photovoltaic inverter and is configured to detect a current value of a leakage current formed by a common-mode voltage of the photovoltaic inverter on a parasitic capacitor. Herein, the parasitic capacitor exists between the photovoltaic module group and the grounded metal frame.

13 Claims, 9 Drawing Sheets

(56) References Cited

U.S. PATENT DOCUMENTS

| | | | | |
|---|---|---|---|---|
| 2012/0024563 | A1* | 2/2012 | Korman | H02S 20/00 174/51 |
| 2012/0223679 | A1* | 9/2012 | Iwai | H01M 10/465 320/167 |
| 2015/0048854 | A1* | 2/2015 | Fornage | H02S 50/00 324/713 |
| 2016/0142007 | A1* | 5/2016 | Yoon | H02J 3/381 363/131 |
| 2016/0322825 | A1* | 11/2016 | Urry | H02J 3/38 |
| 2017/0201189 | A1* | 7/2017 | Li | H02S 40/32 |
| 2018/0019593 | A1* | 1/2018 | Dent | H02M 7/00 |
| 2019/0149086 | A1* | 5/2019 | Jin | H02J 3/388 136/244 |
| 2019/0199100 | A1* | 6/2019 | Kadota | H02J 7/0013 |
| 2019/0288600 | A1* | 9/2019 | Ehara | H02J 3/381 |
| 2020/0169219 | A1* | 5/2020 | Zhang | H02S 40/32 |
| 2021/0058030 | A1* | 2/2021 | Liu | H02S 50/10 |
| 2021/0320589 | A1* | 10/2021 | Choi | H02M 7/5387 |
| 2022/0038052 | A1* | 2/2022 | Yu | H02S 40/32 |
| 2022/0334159 | A1* | 10/2022 | Fischereder | G01R 15/04 |

FOREIGN PATENT DOCUMENTS

| | | |
|---|---|---|
| CN | 104201919 B | 8/2019 |
| CN | 108574403 B | 9/2019 |

OTHER PUBLICATIONS

Liu et al., "An Adaptive Discontinuous Pulse Width Modulation (DPWM) Method for Three Phase Inverter", Applied Power Electronics Conferenced3 and Exposition (APEC), IEEE, Mar. 26, 2017, 6 pages.

* cited by examiner

PHOTOVOLTAIC SYSTEM AND LEAKAGE CURRENT CONTROL METHOD FOR PHOTOVOLTAIC SYSTEM

CROSS-REFERENCE TO RELATED APPLICATION

This application claims priority to Chinese Patent Application No. 202110329154.5, filed on Mar. 27, 2021, which is hereby incorporated by reference in its entirety.

TECHNICAL FIELD

The embodiments relate to the field of power electronics technologies, and in particular, to a photovoltaic system and a leakage current control method for the photovoltaic system.

BACKGROUND

A photovoltaic system is a new-type power generation system that uses a photovoltaic effect of a photovoltaic solar panel to convert solar radiant energy into electrical energy for use by a mains power grid. A photovoltaic inverter is one of main components of the photovoltaic system. The photovoltaic inverter may convert a variable direct current voltage generated by a photovoltaic module such as a photovoltaic solar panel into an alternating current at a mains frequency, and output the alternating current to the mains power grid for use by the mains power grid. Energy conversion efficiency and power quality of the photovoltaic inverter directly affect power generation efficiency of the photovoltaic system. In the photovoltaic system, there is an electrical connection between a photovoltaic array formed by the photovoltaic module and an output load (for example, a power grid) of the photovoltaic inverter, and a parasitic capacitor exists between the photovoltaic array and a grounded metal frame. When the photovoltaic inverter works, a common-mode circuit is formed among the parasitic capacitor-the photovoltaic system-the power grid, and a common-mode voltage forms a common-mode current, namely, a leakage current, on the parasitic capacitor. The common-mode voltage is a voltage of an output midpoint of the photovoltaic inverter relative to the grounded metal frame whose electric potential is fixed. A value of a parasitic capacitance is related to an area and a material of the photovoltaic module, and an environment in which the photovoltaic module is situated. When the parasitic capacitance increases, the leakage current increases accordingly. When a current value of the leakage current exceeds a threshold, an electromagnetic field generated by the leakage current radiates out and causes electromagnetic conduction interference. This affects the power generation efficiency of the photovoltaic system.

In the conventional technology, when the parasitic capacitance in the photovoltaic system is relatively small, a loss of power switching transistors in the photovoltaic inverter is reduced by reducing a direct current bus voltage of the photovoltaic inverter, to improve operating efficiency of the inverter. However, when the parasitic capacitance in the photovoltaic system increases because of rainy weather or the like, and an increase in the leakage current affects normal operation of the photovoltaic inverter, in the conventional technology, a common-mode voltage of the photovoltaic system to the ground is reduced by increasing the direct current bus voltage of the photovoltaic inverter, to reduce an effective value of the leakage current and ensure normal operation of a photovoltaic inverter system. Consequently, the direct current bus voltage fluctuates greatly, and bus utilization is reduced. In addition, in a process of adjusting the direct current bus voltage, a loss of a component in the photovoltaic inverter is large. This results in a loss of a power generation capacity of the photovoltaic system and low applicability.

SUMMARY

A photovoltaic system and a leakage current control method for the photovoltaic system may reduce a leakage current of the photovoltaic system, and prevent bus utilization of a photovoltaic inverter in the photovoltaic system from being reduced. This is simple in operation and high in applicability.

According to a first aspect, a photovoltaic system includes at least one photovoltaic module group, at least one photovoltaic inverter, a grounded metal frame, and a sampling control unit. The photovoltaic module group is mounted on the grounded metal frame. In other words, the grounded metal frame is a metal frame used to mount a photovoltaic module, and the metal frame is grounded. An output end of the photovoltaic module group is connected to an input end of the photovoltaic inverter, and an output end of the photovoltaic inverter is connected to a power grid. The sampling control unit is coupled to both the photovoltaic module group and the photovoltaic inverter. The sampling control unit is configured to detect a current value of a leakage current formed by a common-mode voltage of the photovoltaic inverter on a parasitic capacitor. Herein, the parasitic capacitor exists between the photovoltaic module group and the grounded metal frame. The common-mode voltage of the photovoltaic inverter is a voltage of an output midpoint of the photovoltaic inverter relative to the grounded metal frame whose electric potential is fixed. It can be understood that herein, in a working process in which the photovoltaic inverter provides electrical energy for the power grid, a common-mode circuit is formed among the parasitic capacitor (including the grounded metal frame and the parasitic capacitor)—the photovoltaic system (including the photovoltaic module group and the photovoltaic inverter)—the power grid. The common-mode voltage of the output midpoint of the photovoltaic inverter relative to the grounded metal frame whose electric potential is fixed forms the leakage current on the parasitic capacitor in the common-mode circuit. The sampling control unit may be configured to detect the current value of the leakage current. The sampling control unit is configured to adjust an injection amount of the common-mode voltage in a pulse width modulated signal of the photovoltaic inverter based on the detected current value of the leakage current, to reduce the leakage current. Herein, the leakage current may be a ratio of the common-mode voltage of the photovoltaic inverter (which may also be referred to as a common-mode voltage of the photovoltaic system to the ground) to parasitic impedance of the parasitic capacitor to the ground (which may also be referred to as parasitic impedance of the photovoltaic system to the ground). In a process in which the sampling control unit adjusts the injection amount of the common-mode voltage in the pulse width modulated signal of the photovoltaic inverter based on the current value of the leakage current, the sampling control unit can keep a modulation ratio of the photovoltaic inverter unchanged while controlling the leakage current. In this way, bus utilization of the photovoltaic inverter can be prevented from being reduced, a power generation loss of the photovoltaic inverter can be minimized, and a pulse width modulation effect of the photovoltaic system can be ensured. This is simple in operation and high in applicability.

With reference to the first aspect, in a first possible implementation, the sampling control unit is configured to: when detecting that the current value of the leakage current is greater than a current threshold, reduce a common-mode injection coefficient of the pulse width modulated signal of the photovoltaic inverter to reduce the injection amount of the common-mode voltage in the pulse width modulated signal. The injection amount of the common-mode voltage in the pulse width modulated signal of the photovoltaic inverter can be changed by adjusting the common-mode injection coefficient of the pulse width modulated signal of the photovoltaic inverter, so that an operation is simple and applicability is high. A common-mode injection amount in the pulse width modulated signal of the photovoltaic inverter can be effectively reduced by reducing the common-mode injection coefficient of the pulse width modulated signal of the photovoltaic inverter. While the leakage current is suppressed, the photovoltaic system can still work in a working mode of a current pulse width modulation policy, that is, adjusting the common-mode injection amount does not affect the modulation ratio of the photovoltaic inverter. This can reduce a loss of a power generation capacity of the photovoltaic system. Herein, the pulse width modulated signal of the photovoltaic inverter may be a discontinuous pulse width modulation (DPWM) signal, a space vector pulse width modulation (SVPWM) signal, a sinusoidal pulse width modulation (SPWM) signal, or the like, and may be determined based on an actual application scenario. This is not limited herein.

With reference to the first possible implementation of the first aspect, in a second possible implementation, the sampling control unit is configured to: when a modulation ratio for pulse width modulation of the photovoltaic inverter is less than or equal to 1, reduce the common-mode injection coefficient of the pulse width modulated signal of the photovoltaic inverter until the common-mode injection coefficient is 0. In a scenario in which the modulation ratio for the pulse width modulation of the photovoltaic inverter is less than or equal to 1, for example, the pulse width modulation of the photovoltaic inverter being SPWM, the sampling control unit may reduce the common-mode injection coefficient of the pulse width modulated signal of the photovoltaic inverter to 0 when detecting that the current value of the leakage current is greater than the current threshold. In this case, the injection amount of the common-mode voltage (also referred to as the common-mode injection amount) in the pulse width modulated signal of the photovoltaic inverter is minimum, the photovoltaic system is in a minimum leakage current condition, an operation is simple, and the modulation ratio of the photovoltaic inverter is not affected. In this way, the bus utilization of the photovoltaic inverter (the bus utilization is a ratio of an output voltage of the photovoltaic inverter to a bus voltage) can be prevented from being reduced, power generation efficiency of the photovoltaic system can be ensured, working stability of the photovoltaic system can be ensured, and applicability is high.

With reference to the first possible implementation of the first aspect, in a third possible implementation, the sampling control unit is configured to: when a modulation ratio of the photovoltaic inverter is greater than 1, reduce the common-mode injection coefficient of the pulse width modulated signal of the photovoltaic inverter to reduce the injection amount of the common-mode voltage in the pulse width modulated signal, until the common-mode injection coefficient is 0 and/or the detected current value of the leakage current is less than or equal to the current threshold. In a scenario in which the modulation ratio for pulse width modulation of the photovoltaic inverter is greater than 1, for example, the pulse width modulation of the photovoltaic inverter being DPWM, the sampling control unit may also reduce the common-mode injection coefficient of the pulse width modulated signal of the photovoltaic inverter to 0 when detecting that the current value of the leakage current is greater than the current threshold. In this case, the pulse width modulated signal of the photovoltaic inverter still includes a common-mode injection amount to ensure a DPWM modulation effect of the photovoltaic system and reduce the leakage current of the photovoltaic system without affecting the modulation ratio of the photovoltaic inverter. In this way, the bus utilization of the photovoltaic inverter can be prevented from being reduced, power generation efficiency of the photovoltaic system can be ensured, working stability of the photovoltaic system can be ensured, and applicability is high.

With reference to the third possible implementation of the first aspect, in a fourth possible implementation, when the modulation ratio of the photovoltaic inverter is greater than 1, the sampling control unit is further configured to: if reducing the common-mode injection coefficient to 0 and detecting that the current value of the leakage current is greater than the current threshold, adjust the modulation ratio for the pulse width modulation of the photovoltaic inverter to be less than or equal to 1. When the modulation ratio for the pulse width modulation used to modulate the photovoltaic inverter is less than or equal to 1, the common-mode voltage may not be injected into the pulse width modulated signal of the photovoltaic inverter. In this case, the photovoltaic system may be controlled to be in a minimum leakage current condition. This is simple in operation and high in applicability.

With reference to the fourth possible implementation of the first aspect, in a fifth possible implementation, the sampling control unit is further configured to: when adjusting the modulation ratio for the pulse width modulation of the photovoltaic inverter from being greater than 1 to being less than or equal to 1, directly switch a modulation policy for the pulse width modulation of the photovoltaic inverter, for example, switch the modulation policy for the pulse width modulation of the photovoltaic inverter from DPWM to SPWM, so that the modulation ratio for the pulse width modulation of the photovoltaic inverter is less than or equal to 1. This is simple in operation.

With reference to any one of the first aspect to the fifth possible implementation of the first aspect, in a sixth possible implementation, the photovoltaic system includes at least two photovoltaic module groups and at least two photovoltaic inverters, that is, the photovoltaic system includes a plurality of photovoltaic module groups and a plurality of photovoltaic inverters. A parasitic capacitor exists between one photovoltaic module group and the grounded metal frame, an output end of one photovoltaic module group is connected to an input end of one photovoltaic inverter, and output ends of the plurality of photovoltaic inverters are connected in parallel to the power grid. Photovoltaic module groups of the plurality of photovoltaic module groups and the plurality of photovoltaic inverters form common-mode circuits to the ground. For example, it is assumed that the photovoltaic system includes a photovoltaic module group 1, a photovoltaic module group 2, a photovoltaic inverter 1, and a photovoltaic inverter 2. An output end of the photovoltaic module group 1 is connected to an input end of the photovoltaic inverter 1, an output end of the photovoltaic module group 2 is connected to an input end of the photovoltaic inverter 2, output ends of the photovoltaic inverter 1 and the photovoltaic inverter 2 are connected in parallel to the power grid, a parasitic capacitor 1 exists between the photovoltaic module group 1 and the grounded metal frame, and a parasitic capacitor 2 exists between the photovoltaic module group 2 and the grounded metal frame. In this case, in a working process of the photovoltaic system, a common-mode circuit is formed among the parasitic capacitor 1 (including the grounded metal frame and the parasitic capacitor 1)—the photovoltaic module group 1—the photovoltaic inverter 1—the photovoltaic inverter 2—the photovoltaic module group 2—the parasitic capacitor 2 (including the grounded metal frame and the parasitic capacitor 2). The sampling control unit is configured to: detect a current value of a leakage current formed by common-mode voltages of the plurality of photovoltaic inverters (it can be understood that the output ends of the plurality of photovoltaic inverters are connected in parallel to the power grid, and therefore the common-mode voltages of the photovoltaic inverters are a same voltage, where the common-mode voltage is a voltage of an output midpoint of the plurality of photovoltaic inverters to the ground) on parasitic capacitors (for example, the parasitic capacitor 1 and the parasitic capacitor 2) in the common-mode circuit, and adjust injection amounts of the common-mode voltages in pulse width modulated signals of the plurality of photovoltaic inverters based on the current value, to reduce the leakage current. Herein, modulation policies for pulse width modulation of the plurality of photovoltaic inverters may be a same modulation policy, and the injection amounts that are of the common-mode voltages in the pulse width modulated signals of the plurality of photovoltaic inverters and that can be simultaneously adjusted by the sampling control unit may be a same common-mode injection amount. In this way, the leakage current of the photovoltaic system can be reduced, an operation is simple, an application scenario in which the plurality of photovoltaic inverters are connected in parallel is suitable, and applicability is high.

With reference to any one of the first aspect to the sixth possible implementation of the first aspect, in a seventh possible implementation, the sampling control unit is integrated into the photovoltaic inverter. In other words, the sampling control unit may be a sampling control circuit or a sampling control component in the photovoltaic inverter and may be determined based on an actual application scenario. This is not limited herein. The leakage current of the photovoltaic system is detected and/or controlled by the sampling control unit without a need to additionally deploy a leakage current detection circuit, so that an operation is simple and implementation costs are low.

With reference to any one of the first aspect to the seventh possible implementation of the first aspect, in an eighth possible implementation, the photovoltaic inverter includes a direct current DC/DC conversion module, an energy storage module, and a DC/alternating current AC conversion module. An input end of the DC/DC conversion module is used as the input end of the photovoltaic inverter, an output end of the DC/DC conversion module is connected to an input end of the DC/AC conversion module through the energy storage module, and an output end of the DC/AC conversion module is used as the output end of the photovoltaic inverter. Electrical energy generated due to a photovoltaic effect of the photovoltaic module group may be directly input to the photovoltaic inverter, voltage boosting/rectification is implemented by using the DC/DC conversion module in the photovoltaic inverter, and the electrical energy is stored in the energy storage module. The energy storage module herein may include a bus capacitor of the photovoltaic inverter. An output voltage of the bus capacitor may be converted by the DC/AC conversion module into an alternating current voltage needed by the power grid, and the alternating current voltage is output to the power grid. Herein, the photovoltaic inverter may be an isolated photovoltaic inverter or a non-isolated photovoltaic inverter, and correspondingly a circuit topology of the DC/DC conversion module and the DC/AC conversion module in the photovoltaic inverter may be an isolated circuit topology or a non-isolated circuit topology. The photovoltaic inverter and the circuit topology may be determined based on an actual application scenario requirement. This is not limited herein.

With reference to any one of the first aspect to the seventh possible implementation of the first aspect, in a ninth possible implementation, the photovoltaic inverter may be a DC/AC conversion module, and the photovoltaic system further includes an energy storage module; and the output end of the photovoltaic module group in the photovoltaic system may be connected to an input end of the DC/AC conversion module through the energy storage module, and an output end of the DC/AC conversion module is used as the output end of the photovoltaic inverter. Optionally, the energy storage module may be an energy storage battery or a direct current bus in the photovoltaic system and may be determined based on an actual application scenario. This is not limited herein.

With reference to any one of the first aspect to the ninth possible implementation of the first aspect, in a tenth possible implementation, in the photovoltaic system, one photovoltaic module group includes a plurality of photovoltaic strings, the plurality of photovoltaic strings are connected in parallel, and one photovoltaic string may be formed by one photovoltaic module or formed by connecting a plurality of photovoltaic modules in series. Herein, a parallel connection end of the plurality of photovoltaic strings is used as the output end of the photovoltaic module group. Optionally, the output end of the photovoltaic module group may be connected to the input end of the photovoltaic inverter through a combiner box or may be connected to the input end of the photovoltaic inverter through a combiner box and the energy storage unit. This may be determined based on an actual application scenario and is not limited herein.

According to a second aspect, a leakage current control method for a photovoltaic system is applicable to the sampling control unit in the photovoltaic system provided in any one of the first aspect to the ninth possible implementation of the first aspect. A parasitic capacitor exists between the photovoltaic module group and the grounded metal frame. The method includes: The sampling control unit detects a current value of a leakage current formed by a common-mode voltage of the photovoltaic inverter on the parasitic capacitor; and adjusts an injection amount of the common-mode voltage in a pulse width modulated signal of the photovoltaic inverter based on the detected current value, to reduce the leakage current. In a process in which the sampling control unit adjusts the injection amount of the common-mode voltage in the pulse width modulated signal of the photovoltaic inverter based on the current value of the leakage current, the sampling control unit can keep a modulation ratio of the photovoltaic inverter unchanged while controlling the leakage current. In this way, bus utilization of the photovoltaic inverter can be prevented from being reduced, a power generation loss of the photovoltaic inverter can be minimized, and a pulse width modulation effect of the photovoltaic system can be ensured. This is simple in operation and high in applicability.

With reference to the second aspect, in a first possible implementation, in a process in which the sampling control unit adjusts the injection amount of the common-mode voltage in the pulse width modulated signal of the photovoltaic inverter based on the detected current value, if the current value is greater than a current threshold, a common-mode injection coefficient of the pulse width modulated signal of the photovoltaic inverter may be reduced to reduce the injection amount of the common-mode voltage in the pulse width modulated signal. The injection amount of the common-mode voltage in the pulse width modulated signal of the photovoltaic inverter can be changed by adjusting the common-mode injection coefficient of the pulse width modulated signal of the photovoltaic inverter, so that an operation is simple and applicability is high.

With reference to the first possible implementation of the second aspect, in a second possible implementation, in a process in which the sampling control unit reduces the common-mode injection coefficient of the pulse width modulated signal of the photovoltaic inverter, if a modulation ratio for pulse width modulation of the photovoltaic inverter is less than or equal to 1, the common-mode injection coefficient of the pulse width modulated signal of the photovoltaic inverter may be reduced until the common-mode injection coefficient is 0. In a scenario in which the modulation ratio for the pulse width modulation of the photovoltaic inverter is less than or equal to 1, for example, the pulse width modulation of the photovoltaic inverter being SPWM, the sampling control unit may reduce the common-mode injection coefficient of the pulse width modulated signal of the photovoltaic inverter to 0 when detecting that the current value of the leakage current is greater than the current threshold. In this case, the injection amount of the common-mode voltage in the pulse width modulated signal of the photovoltaic inverter is minimum, the photovoltaic system is in a minimum leakage current condition, an operation is simple, and the modulation ratio of the photovoltaic inverter is not affected. In this way, the bus utilization of the photovoltaic inverter can be prevented from being reduced, power generation efficiency of the photovoltaic system can be ensured, working stability of the photovoltaic system can be ensured, and applicability is high.

With reference to the first possible implementation of the second aspect, in a third possible implementation, in a process in which the sampling control unit reduces the common-mode injection coefficient of the pulse width modulated signal of the photovoltaic inverter, if a modulation ratio of the photovoltaic inverter is greater than 1, the common-mode injection coefficient of the pulse width modulated signal of the photovoltaic inverter may be reduced until the common-mode injection coefficient is 0 and/or the detected current value of the leakage current is less than or equal to the current threshold. In a scenario in which the modulation ratio for pulse width modulation of the photovoltaic inverter is greater than 1, when the common-mode injection coefficient of the pulse width modulated signal of the photovoltaic inverter is reduced to 0, the pulse width modulated signal of the photovoltaic inverter still includes a common-mode injection amount to ensure a DPWM modulation effect of the photovoltaic system, and reduce the leakage current of the photovoltaic system without affecting the modulation ratio of the photovoltaic inverter. In this way, the bus utilization of the photovoltaic inverter can be prevented from being reduced, power generation efficiency of the photovoltaic system can be ensured, working stability of the photovoltaic system can be ensured, and applicability is high.

With reference to the third possible implementation of the second aspect, in a fourth possible implementation, the method further includes: if the common-mode injection coefficient is reduced to 0 and the detected current value of the leakage current is greater than the current threshold, the sampling control unit adjusts the modulation ratio for the pulse width modulation of the photovoltaic inverter to be less than or equal to 1. When the modulation ratio for the pulse width modulation used to modulate the photovoltaic inverter is less than or equal to 1, the common-mode voltage may not be injected into the pulse width modulated signal of the photovoltaic inverter. In this case, the photovoltaic system may be controlled to be in a minimum leakage current condition. This is simple in operation and high in applicability.

With reference to the fourth possible implementation of the second aspect, in a fifth possible implementation, the adjusting the modulation ratio for the pulse width modulation of the photovoltaic inverter to be less than or equal to 1 includes: switching a modulation policy for the pulse width modulation of the photovoltaic inverter, so that the modulation ratio for the pulse width modulation of the photovoltaic inverter is less than or equal to 1. This is simple in operation.

DETAILED DESCRIPTION OF THE EMBODIMENTS

With progress of a production technology in the industry and highlighting of economies of scale, economy of photovoltaic power generation has been gradually improved, the industry has indeed entered an era of grid parity, and a quantity of newly installed photovoltaic units is growing rapidly. A photovoltaic system may be a power supply system based on solar photovoltaic power generation. Solar photovoltaic power generation has no moving parts, no noise, no pollution, high reliability, and other characteristics, and has excellent application prospects for communication power supply systems in remote regions. The photovoltaic system is applicable to power supply for a plurality of types of electrical devices, such as power supply for base station equipment, power supply for a storage battery, or power supply for a household device (for example, a refrigerator or an air conditioner). An application scope of the photovoltaic system may be determined based on an actual application scenario and is not limited herein. A photovoltaic inverter is one of main components of the photovoltaic system, with a huge market scale and promising market prospects. The photovoltaic inverter may be configured to convert a variable direct current voltage generated by a direct current power supply such as a photovoltaic solar panel (namely, a photovoltaic module) into an alternating current at a mains frequency, and output the alternating current to a mains power grid (namely, an alternating current power grid) for use by the mains power grid. The alternating current may be used by base station equipment, a storage battery, or a household device in the mains power grid. The photovoltaic system is adaptable to different application scenarios, for example, a solar power supply scenario and a solar hybrid power supply scenario. This may be determined based on an actual application scenario and is not limited herein. A solar power supply scenario is used as an example.

Figure 1:
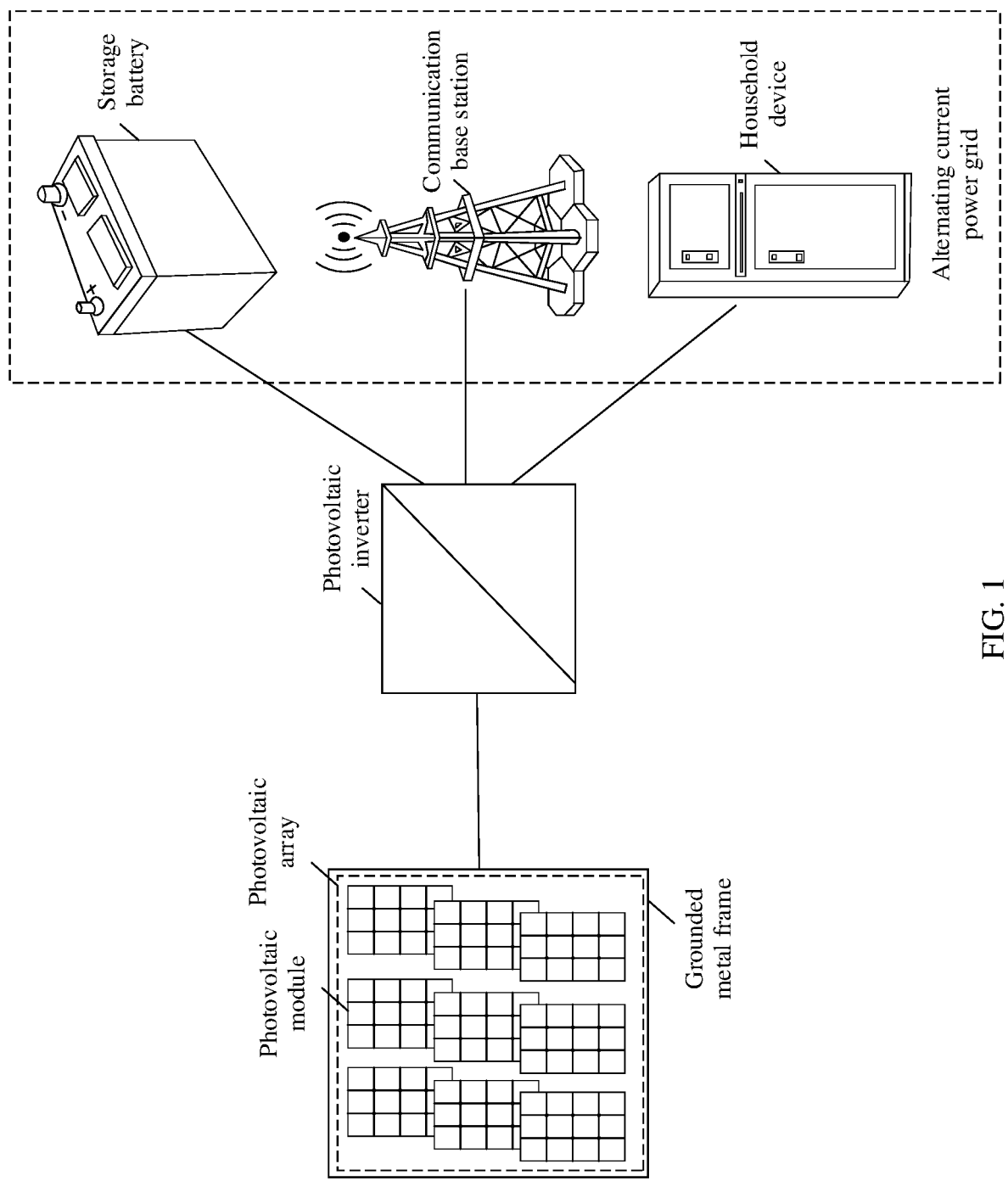
FIG. 1 is a schematic diagram of an application scenario of a photovoltaic system.
Figure 2:
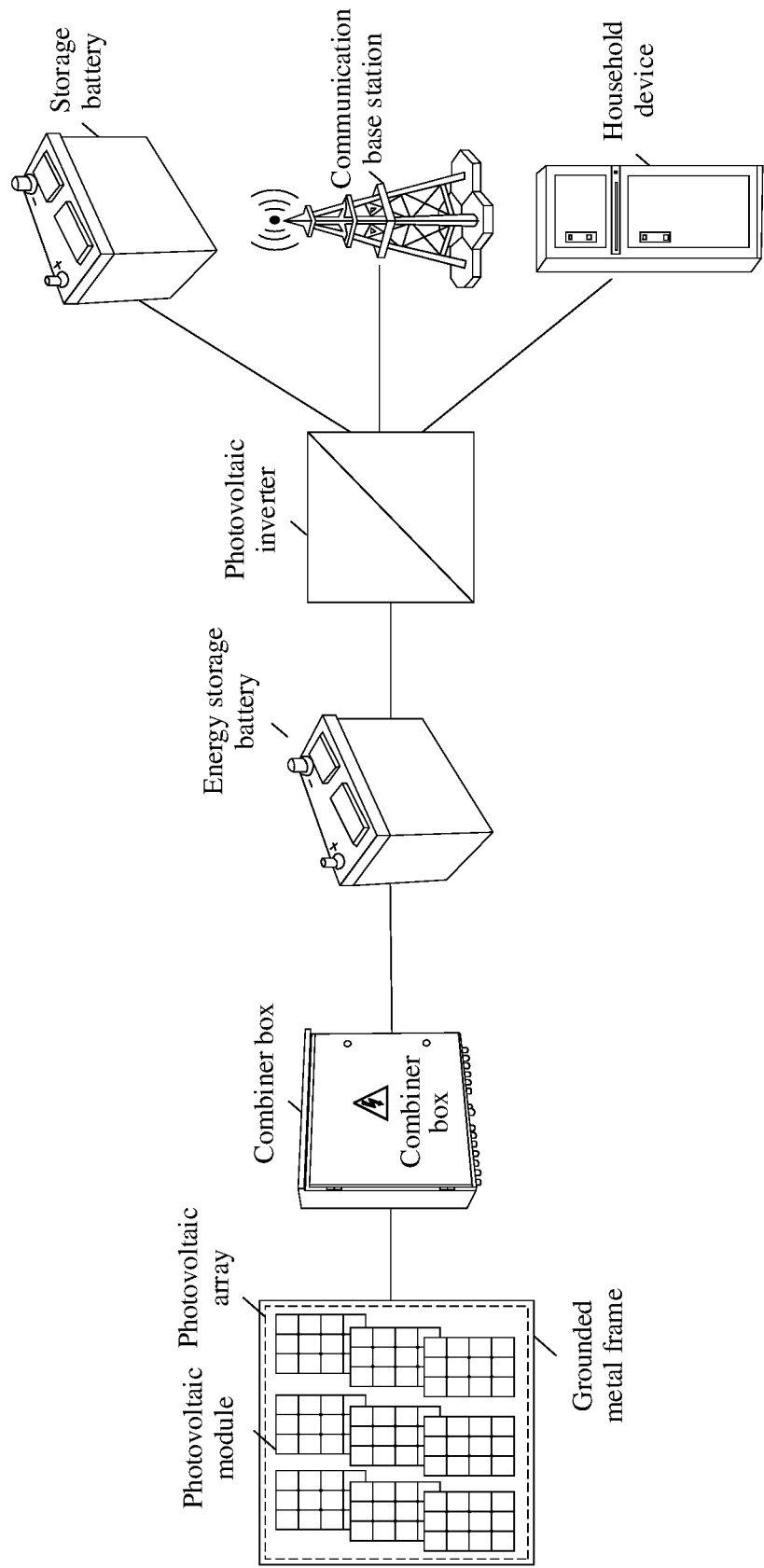
FIG. 2 is another schematic diagram of an application scenario of a photovoltaic system.

FIG. 1 is a schematic diagram of an application scenario of a photovoltaic system. In the photovoltaic system, an output end of a photovoltaic array may be connected to an input end of a photovoltaic inverter, and an output end of the photovoltaic inverter is connected to an alternating current power grid. The inverter may convert a direct current input by the photovoltaic array into an alternating current and transfer the alternating current to the alternating current power grid. In the photovoltaic system shown in FIG. 1, a photovoltaic array may be a photovoltaic module group, one photovoltaic module group may include one photovoltaic string or a plurality of photovoltaic strings connected in parallel, and one photovoltaic string may be formed by one photovoltaic module or formed by connecting a plurality of photovoltaic modules in series. The photovoltaic module herein may be a solar panel, a photovoltaic panel, or an energy storage battery. In other words, in the photovoltaic system shown in FIG. 1, one photovoltaic string may be a photovoltaic string formed by one solar panel, photovoltaic panel, or energy storage cell or formed by connecting a plurality of solar panels, photovoltaic panels, or energy storage cells in series. An output current of a plurality of photovoltaic strings may be used to provide a direct current input voltage for the photovoltaic inverter, and after voltage power conversion is performed by the photovoltaic inverter, the output current is used by an electrical device such as a storage battery, a communication base station, or a household device in the alternating current power grid. Optionally, FIG. 2 is another schematic diagram of an application scenario of a photovoltaic system. Output currents of a plurality of photovoltaic strings may be used to provide a direct current input voltage for the photovoltaic inverter after the output currents converge by using a combiner box (that is, the plurality of photovoltaic strings are connected in parallel to the combiner box), and after voltage power conversion is performed by the photovoltaic inverter, the output current is used by an electrical device such as a storage battery, a communication base station, or a household device in the alternating current power grid. Optionally, energy may be stored in the energy storage battery after the output currents of the plurality of photovoltaic strings converge by using the combiner box (that is, the plurality of photovoltaic strings are connected in parallel to the combiner box), the energy storage battery provides the direct current input voltage for the photovoltaic inverter, and after voltage power conversion is performed by the photovoltaic inverter, the output current is used by the electrical device such as a storage battery, a communication base station, or a household device in the alternating current power grid. In the application scenario shown in FIG. 1 and/or the application scenario shown FIG. 2, the photovoltaic modules may be mounted on a grounded metal frame. In other words, the grounded metal frame is a metal frame used to mount a photovoltaic module, and the metal frame is grounded. In particular, in remote regions or rugged mountainous regions, or on terrains such as water surfaces where geographical environments are poor but sunlight is abundant, a metal frame may be used to fasten and mount a photovoltaic module, to better use a photovoltaic effect of the photovoltaic module to convert solar radiant energy into electrical energy. However, in the photovoltaic system shown in FIG. 1 and/or FIG. 2, there is an electrical connection between the photovoltaic array, the photovoltaic inverter, and the alternating current power grid, and a parasitic capacitor exists between the photovoltaic array and the grounded metal frame. When the photovoltaic inverter works, a common-mode circuit is formed among the parasitic capacitor-the photovoltaic array-the photovoltaic inverter-the power grid. A voltage (namely, a common-mode voltage) of an output midpoint of the photovoltaic inverter relative to the grounded metal frame whose electric potential is fixed forms a common-mode current (namely, a leakage current or referred to as a leakage current of the photovoltaic system) on the parasitic capacitor. A value of a parasitic capacitance is related to an area and a material of the photovoltaic module, and a geographical environment in which the photovoltaic module is situated. When the parasitic capacitance increases, the leakage current increases accordingly. An electromagnetic field generated by the leakage current radiates out and causes electromagnetic conduction interference. This affects power generation efficiency of the photovoltaic system.

In the photovoltaic system, the leakage current of the photovoltaic system is controlled by adjusting an injection amount of the common-mode voltage (or referred to as a common-mode injection amount) in a pulse width modulated signal of the photovoltaic inverter, to reduce the leakage current of the photovoltaic system. A modulation ratio of the photovoltaic inverter can be kept unchanged while controlling the leakage current. In this way, bus utilization of the photovoltaic inverter can be prevented from being reduced, a power generation loss of the photovoltaic inverter can be minimized, and a pulse width modulation effect of the photovoltaic system can be ensured. This is simple in operation and high in applicability. For ease of description, the following uses the photovoltaic system in the application scenario shown in FIG. 1 as an example for description.

Figure 3:
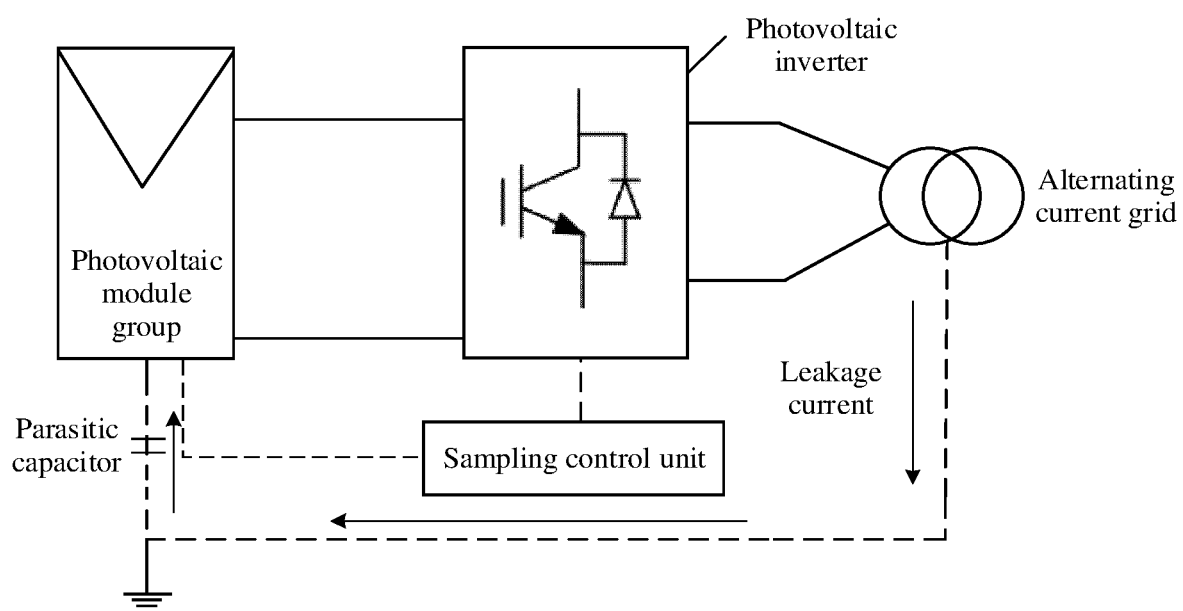
FIG. 3 is a schematic diagram of a structure of a photovoltaic system.

FIG. 3 is a schematic diagram of a structure of a photovoltaic system. The photovoltaic system shown in FIG. 3 includes a photovoltaic module group, a photovoltaic inverter, a grounded metal frame (not shown in FIG. 3), and a sampling control unit. The photovoltaic module group may be mounted on the grounded metal frame, an output end of the photovoltaic module group is connected to an input end of the photovoltaic inverter, and an output end of the photovoltaic inverter is connected to a power grid (namely, an alternating current power grid).

Figure 4:
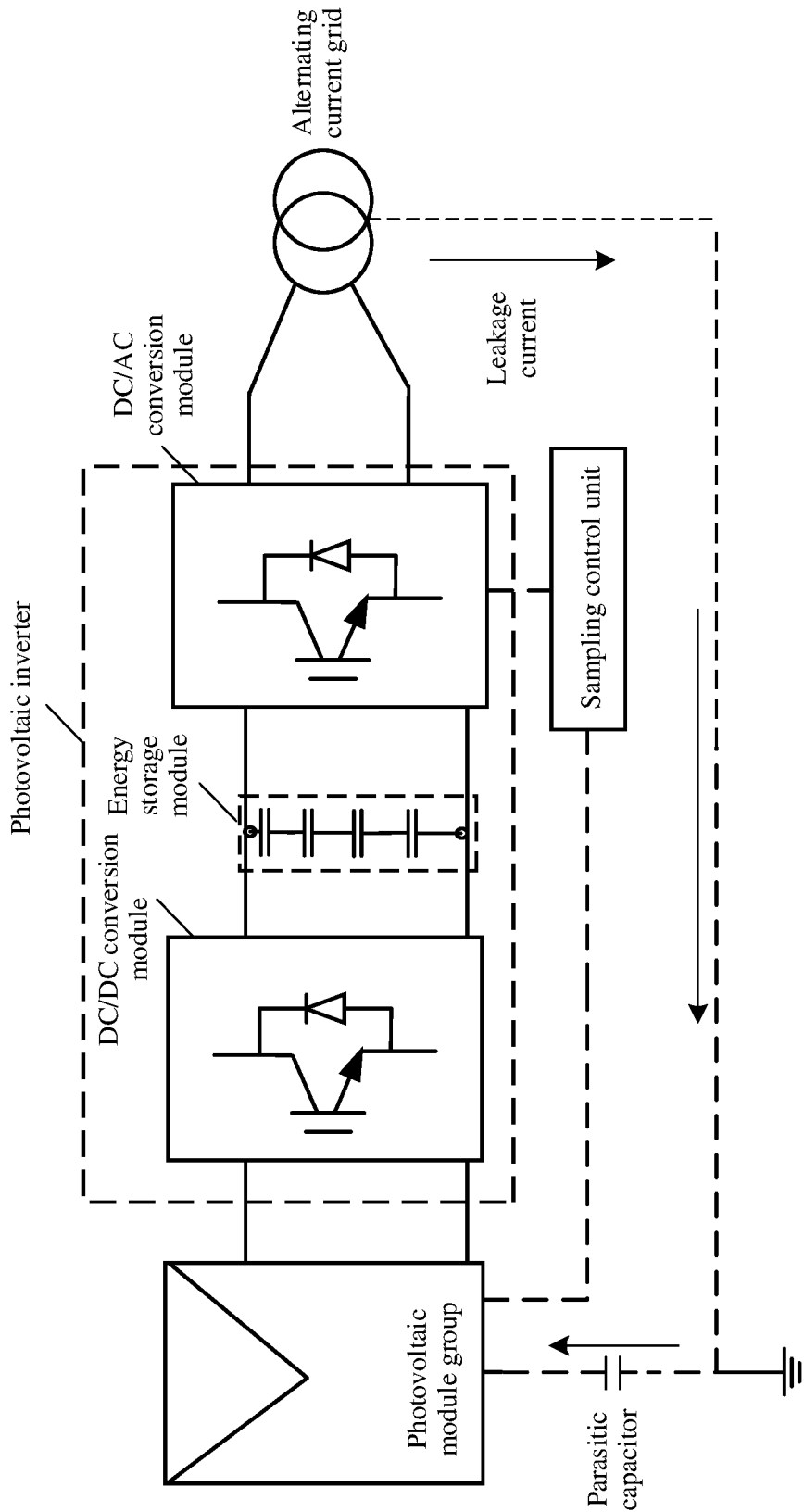
FIG. 4 is another schematic diagram of a structure of a photovoltaic system.

FIG. 4 is another schematic diagram of a structure of a photovoltaic system. Optionally, as shown in FIG. 4, the photovoltaic inverter includes a direct current to direct current (DC/DC) conversion module, an energy storage module, and a direct current to alternating current (DC/AC) conversion module. An input end of the DC/DC conversion module is used as the input end of the photovoltaic inverter, an output end of the DC/DC conversion module is connected to an input end of the DC/AC conversion module through the energy storage module, and an output end of the DC/AC conversion module is used as the output end of the photovoltaic inverter. Electrical energy generated due to a photovoltaic effect of the photovoltaic module group may be directly input to the photovoltaic inverter, voltage boosting/rectification is implemented by using the DC/DC conversion module in the photovoltaic inverter, and the electrical energy is stored in the energy storage module. The energy storage module herein may include a bus capacitor of the photovoltaic inverter. An output voltage of the bus capacitor may be converted by the DC/AC conversion module into an alternating current voltage needed by the power grid, and the alternating current voltage is output to the power grid. Herein, the photovoltaic inverter may be an isolated photovoltaic inverter or a non-isolated photovoltaic inverter, and correspondingly a circuit topology of the DC/DC conversion module and the DC/AC conversion module in the photovoltaic inverter may be an isolated circuit topology or a non-isolated circuit topology. The photovoltaic inverter and the circuit topology may be determined based on an actual application scenario requirement. This is not limited herein. Optionally, the photovoltaic inverter may alternatively be a DC/AC converter. In this case, the output end of the photovoltaic module group may be connected to the input end of the photovoltaic inverter through the energy storage module. The energy storage module may be an energy storage battery or a direct current bus in the photovoltaic system and may be determined based on an actual application scenario. This is not limited herein.

In some feasible implementations, in the photovoltaic system shown in FIG. 3 and/or FIG. 4 (for ease of description, the following uses FIG. 3 as an example for description, and details are not described below again), the photovoltaic module group may be a photovoltaic array, one photovoltaic module group may include one photovoltaic string or a plurality of photovoltaic strings connected in parallel, and one photovoltaic string may be formed by one photovoltaic module or formed by connecting a plurality of photovoltaic modules in series. The photovoltaic module group is mounted on the grounded metal frame. In other words, the grounded metal frame is a metal frame used to mount a photovoltaic module, and the metal frame is grounded. In the photovoltaic system shown in FIG. 3, a parasitic capacitor exists between the photovoltaic module group and the grounded metal frame. When the photovoltaic inverter works (for example, in a process in which the photovoltaic inverter is connected to the alternating current power grid and provides electrical energy for the alternating current power grid), a common-mode circuit is formed among the parasitic capacitor-the photovoltaic module group-the photovoltaic inverter-the power grid. A common-mode voltage of an output midpoint of the photovoltaic inverter relative to the grounded metal frame whose electric potential is fixed forms a leakage current on the parasitic capacitor in the common-mode circuit. The leakage current may also be referred to as a leakage current of the photovoltaic system. In other words, as shown in FIG. 3, the common-mode voltage of the photovoltaic inverter forms a leakage current in the common-mode circuit, and the leakage current may flow through the parasitic capacitor, the photovoltaic module group, the photovoltaic inverter, the alternating current power grid, and the like. In the photovoltaic system shown in FIG. 3, the sampling control unit may be coupled to both the photovoltaic module group and the photovoltaic inverter. The sampling control unit may be configured to: detect a current value of the leakage current and adjust an injection amount of the common-mode voltage in a pulse width modulated signal of the photovoltaic inverter based on the detected current value of the leakage current, to reduce the leakage current.

In some feasible implementations, the photovoltaic system may alternatively include a plurality of photovoltaic module groups and a plurality of photovoltaic inverters. A parasitic capacitor exists between one photovoltaic module group and a grounded metal frame, an output end of one photovoltaic module group is connected to an input end of one photovoltaic inverter, and output ends of the plurality of photovoltaic inverters are connected in parallel to a power grid. Optionally, the plurality of photovoltaic module groups may be mounted on one grounded metal frame, or one photovoltaic module group may be installed on one grounded metal frame (the photovoltaic system may include a plurality of grounded metal frames in this case). This may be determined based on an actual application scenario and is not limited herein.

Figure 5:
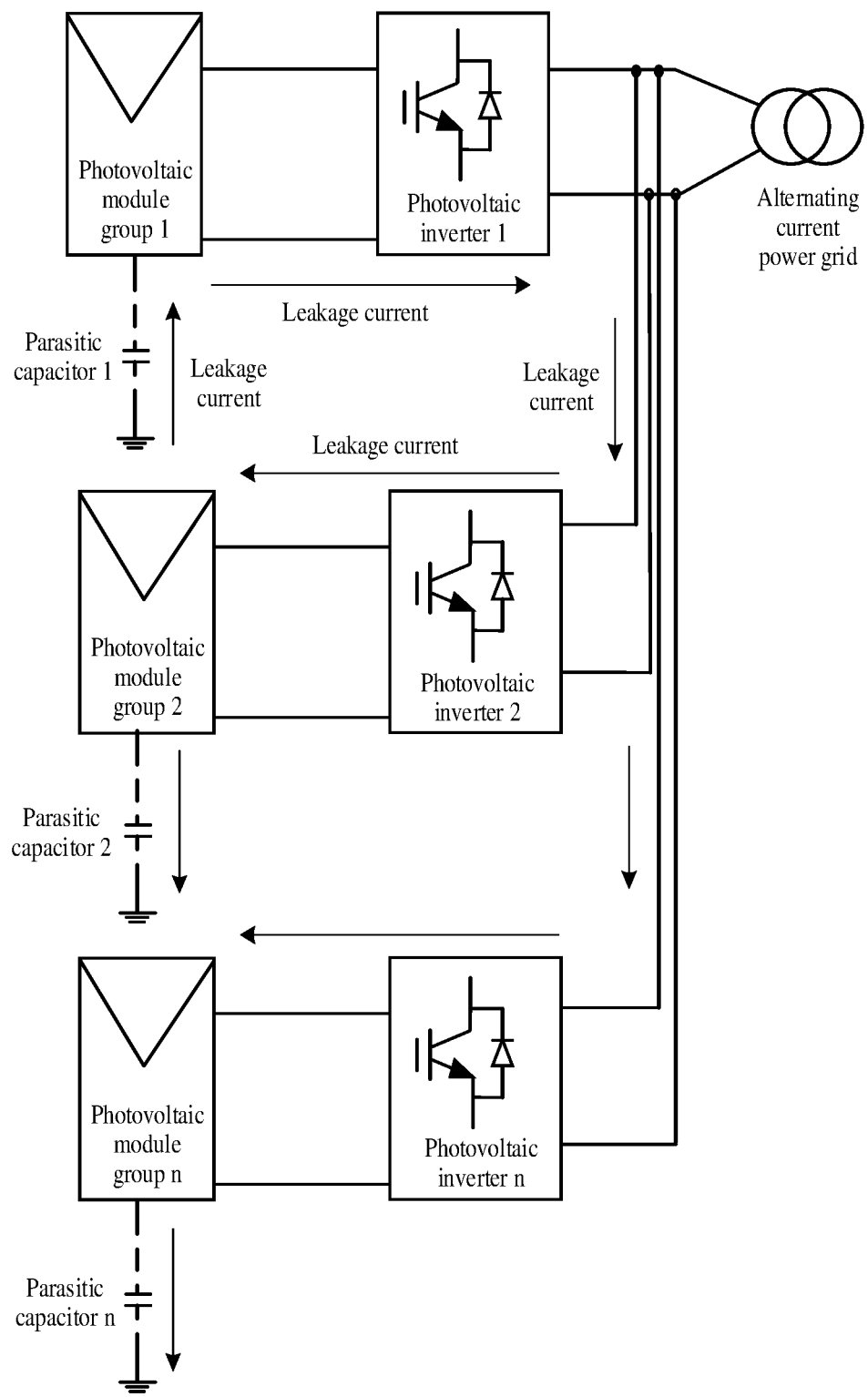
FIG. 5 is another schematic diagram of a structure of a photovoltaic system.

FIG. 5 is another schematic diagram of a structure of a photovoltaic system. As shown in FIG. 5, it is assumed that the photovoltaic system includes n photovoltaic module groups and n photovoltaic inverters. The n photovoltaic module groups may include a photovoltaic module group 1, a photovoltaic module group 2, . . . , and a photovoltaic module group n, and the n photovoltaic inverters may include a photovoltaic inverter 1, a photovoltaic inverter 2, . . . , and a photovoltaic inverter n, where n is an integer greater than 1. Correspondingly, the photovoltaic system shown in FIG. 5 may include a parasitic capacitor 1, a parasitic capacitor 2, . . . , and a parasitic capacitor n. Photovoltaic module groups of the n photovoltaic module groups and the n photovoltaic inverters form common-mode circuits to the ground. For example, it is assumed that the photovoltaic system includes a photovoltaic module group 1, a photovoltaic module group 2, a photovoltaic inverter 1, and a photovoltaic inverter 2. An output end of the photovoltaic module group 1 is connected to an input end of the photovoltaic inverter 1, an output end of the photovoltaic module group 2 is connected to an input end of the photovoltaic inverter 2, output ends of the photovoltaic inverter 1 and the photovoltaic inverter 2 are connected in parallel to the power grid, a parasitic capacitor 1 exists between the photovoltaic module group 1 and the grounded metal frame, and a parasitic capacitor 2 exists between the photovoltaic module group 2 and the grounded metal frame. In this case, in a working process of the photovoltaic system, a common-mode circuit is formed among the parasitic capacitor 1 (including the grounded metal frame and the parasitic capacitor 1)—the photovoltaic module group 1—the photovoltaic inverter 1—the photovoltaic inverter 2—the photovoltaic module group 2—the parasitic capacitor 2 (including the grounded metal frame and the parasitic capacitor 2). A common-mode voltage of an output midpoint of the photovoltaic inverter relative to the grounded metal frame whose electric potential is fixed forms a leakage current on the parasitic capacitor in the common-mode circuit. It can be understood that in the photovoltaic system shown in FIG. 5, the output ends of the photovoltaic inverters are connected in parallel to the alternating current power grid. In this case, output midpoints of the photovoltaic inverters have a same electric potential. Therefore, common-mode voltages of the photovoltaic inverters are a same voltage in this case, where the common-mode voltage is a voltage of the output midpoint of the plurality of photovoltaic inverters to the ground. The common-mode voltage may form a leakage current on parasitic capacitors (for example, the parasitic capacitor 1 and the parasitic capacitor 2) in the common-mode circuit.

In some feasible implementations, the photovoltaic system shown in FIG. 5 may include one sampling control unit (not shown in FIG. 5). The sampling control unit may be a central control unit in the photovoltaic system and may be a functional unit independent of the photovoltaic inverters in the photovoltaic system. The sampling control unit may be coupled to each photovoltaic module group and each photovoltaic inverter and may be configured to: collect a current value of the leakage current in the common-mode circuit shown in FIG. 5 and adjust injection amounts of the common-mode voltages in pulse width modulated signals of the photovoltaic inverters based on the current value, to reduce the leakage current. Herein, modulation policies for pulse width modulation of the plurality of photovoltaic inverters may be a same modulation policy, and the injection amounts that are of the common-mode voltages in the pulse width modulated signals of the plurality of photovoltaic inverters and that can be simultaneously adjusted by the sampling control unit may be a same common-mode injection amount. In this way, the leakage current of the photovoltaic system can be reduced, an operation is simple, an application scenario in which the photovoltaic inverters are connected in parallel is suitable, and applicability is high. Optionally, in the photovoltaic system shown in FIG. 5, there may alternatively be a plurality of sampling control units. One sampling control unit is connected to one photovoltaic module group and one photovoltaic inverter. Optionally, a sampling control unit connected to any photovoltaic inverter may be a functional unit independent of the photovoltaic inverter in the photovoltaic system. The sampling control unit may alternatively be a functional unit in the photovoltaic inverter; in other words, the sampling control unit may be integrated into the photovoltaic inverter. A location of the sampling control unit may be determined based on an actual application scenario. This is not limited herein. The sampling control unit connected to the any photovoltaic inverter may be configured to: detect the leakage current in the common-mode circuit and adjust an injection amount of the common-mode voltage in a pulse width modulated signal of the photovoltaic inverter based on a current value, to reduce the leakage current. It can be understood that, in this case, leakage currents detected by the sampling control units are a leakage current in one common-mode circuit. Therefore, the sampling control units may use a same leakage current control policy to adjust injection amounts of the common-mode voltages in pulse width modulated signals of the photovoltaic inverters, so that the injection amounts of the common-mode voltages in the pulse width modulated signals of the photovoltaic inverters are equal, and the common-mode voltages of the output midpoints of the photovoltaic inverters relative to the grounded metal frame whose electric potential is fixed are equal. In this way, the leakage current in the common-mode circuit can be reduced, an operation is simple, an application scenario in which the photovoltaic inverters are connected in parallel is suitable, and applicability is high.

In some feasible implementations, in the foregoing photovoltaic systems (the photovoltaic systems shown in FIG. 1 to FIG. 5 are referred to as the foregoing photovoltaic systems below), the pulse width modulation policy of the photovoltaic inverter may be DPWM, SVPWM, SPWM, or the like, and may be determined based on an actual application scenario. This is not limited herein. Correspondingly, the pulse width modulated signal of the photovoltaic inverter may be a DPWM signal, an SVPWM signal, an SPWM signal, or the like, and may be determined based on an actual application scenario. This is not limited herein. For ease of description, the following uses a DPWM signal as an example for description. The sampling control unit may adjust the injection amount of the common-mode voltage in the DPWM of the photovoltaic inverter based on the current value that is of the leakage current and that is detected in real time, to adjust the common-mode voltage of the photovoltaic inverter. The common-mode voltage herein is a voltage with a zero sequence characteristic, and therefore the common-mode voltage may also be referred to as a zero sequence voltage. Both a rectifier circuit and an inverter circuit have a common-mode voltage. From a perspective of a circuit structure, if the photovoltaic inverter is connected to the power grid, when a neutral point of the power grid is led out and is connected to a reference ground, the common-mode voltage is a value of a voltage between an output midpoint of the inverter and the reference ground. When a lead-out point of the neutral point of the power grid is not grounded, a voltage value of the common-mode voltage is a voltage from the output point of the inverter to the neutral point plus a value of a voltage between the neural point and the reference ground. For ease of description, the following uses an example for description in which the common-mode voltage is a voltage of the output midpoint of the inverter relative to the grounded metal frame whose electric potential is fixed, which is referred to as the common-mode voltage of the photovoltaic inverter below.

In some feasible implementations, in the DPWM of the photovoltaic system, injecting the common-mode voltage into the pulse width modulated signal of the photovoltaic inverter can improve utilization of a bus voltage of the photovoltaic inverter. Utilization of the bus voltage of the photovoltaic inverter may be a ratio of an output voltage of the photovoltaic inverter to the bus voltage. Injecting the common-mode voltage into the pulse width modulated signal of the photovoltaic inverter can improve the output voltage of the photovoltaic inverter and can improve the utilization of the bus voltage of the photovoltaic inverter while the bus voltage of the photovoltaic inverter is kept unchanged.

Figure 6:
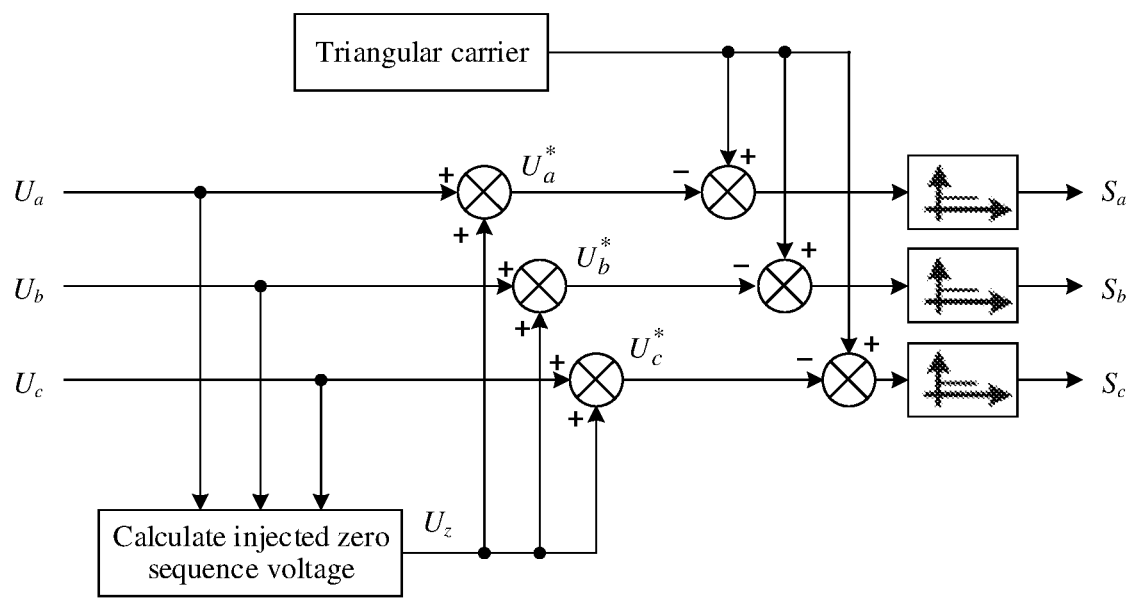
FIG. 6 is a schematic diagram of injection of a common-mode voltage into a discontinuous pulse width modulated signal.

FIG. 6 is a schematic diagram of injection of a common-mode voltage into a discontinuous pulse width modulated signal. As shown in FIG. 6, it is assumed that an original modulated signal (namely, an original modulated wave or an original modulated voltage) in the pulse width modulated signal of the photovoltaic inverter is a three-phase sinusoidal modulated signal $U_x$ (x=a, b, c) (namely, a three-phase sinusoidal modulated wave or a three-phase sinusoidal modulated voltage); injection of the common-mode voltage is injection of a zero sequence voltage $U_z$; a three-phase modulated voltage $U_x^*$(x=a, b, c) (namely, a three-phase modulated signal or a three-phase modulated wave) that is present after an injected zero sequence voltage is superimposed may be obtained after the original modulated voltage and the injected zero sequence voltage are superimposed; and the pulse width modulated signal $S_x$ (x=a, b, c) can be obtained by comparing the three-phase modulated wave with a triangular carrier. In this case, $S_x$ (x=a, b, c) may be used to indicate switching states of power switching transistors when the input voltage is changed into the three-phase modulated voltage, and after the switching actions of the power switching transistors at the three-phase modulated voltage in the photovoltaic inverter are controlled based on the pulse width modulated signal, the common-mode voltage may be obtained from the output midpoint of the photovoltaic inverter. The common-mode voltage may form a leakage current in the common-mode circuit in the photovoltaic system. In the common-mode voltage injection shown in FIG. 6, the zero sequence voltage $U_z$ may be calculated based on the original modulated voltage, and a peak value of the triangular carrier may be half of a direct current—side voltage value of the photovoltaic inverter. As shown in FIG. 6, in the DPWM, an expression of the modulated wave after the zero sequence voltage is injected may be as follows:

$$U_x^* = U_x + U_z$$

$U_x^*$ (x=a, b, c) is the three-phase modulated wave obtained after the zero sequence voltage injection, $U_x$ (x=a, b, c) is the three-phase sinusoidal modulated wave, and $U_z$ is the injected zero sequence voltage (namely, the common-mode voltage). It can be learned that in the pulse width modulated signal of the photovoltaic inverter, changing the injection amount of the common-mode voltage (for example, an injection amount of the zero sequence voltage) can change the common-mode voltage of the photovoltaic inverter, and can further change the leakage current of the photovoltaic system. All the voltage values are presented in forms of per-unit values, and a voltage reference value is half of the direct current—side voltage of the photovoltaic inverter.

In some feasible implementations, the leakage current of the photovoltaic system may be a ratio of the common-mode voltage of the photovoltaic inverter (which may also be referred to as a common-mode voltage of the photovoltaic system to the ground) to parasitic impedance of the parasitic capacitor of the photovoltaic system to the ground (which may also be referred to as parasitic impedance of the photovoltaic system to the ground), and may be expressed by using the following simplified formula:

$$I = \frac{U}{Z}$$

I is the leakage current, U is the common-mode voltage of the photovoltaic system to the ground, and Z is the parasitic impedance of the photovoltaic system to the ground. It can be learned that, when the parasitic impedance of the photovoltaic system to the ground is unchanged, reducing the common-mode injection amount (namely, the injection amount of the zero sequence voltage or the injection amount of the common-mode voltage) of the photovoltaic system can reduce the common-mode voltage of the photovoltaic system to the ground, thereby reducing the leakage current of the photovoltaic system.

In some feasible implementations, the sampling control unit may adjust the injection amount of the common-mode voltage in the pulse width modulated signal (that is, the DPWM signal) of the photovoltaic inverter based on the detected current value of the leakage current, to reduce the leakage current of the photovoltaic system. Herein, in a process in which the sampling control unit adjusts the injection amount of the common-mode voltage in the pulse width modulated signal of the photovoltaic inverter based on the current value of the leakage current, the sampling control unit can keep a modulation ratio of the photovoltaic inverter unchanged while controlling the leakage current. In this way, bus utilization of the photovoltaic inverter can be prevented from being reduced, a power generation loss of the photovoltaic inverter can be minimized, and a pulse width modulation effect of the photovoltaic system can be ensured. This is simple in operation and high in applicability.

Optionally, in some feasible implementations, when detecting that the current value of the leakage current is greater than a current threshold, the sampling control unit may reduce a common-mode injection coefficient of the pulse width modulated signal of the photovoltaic inverter to reduce the injection amount of the common-mode voltage in the pulse width modulated signal. Herein, the injection amount of the common-mode voltage in the pulse width modulated signal of the photovoltaic inverter can be changed by adjusting the common-mode injection coefficient of the pulse width modulated signal of the photovoltaic inverter by the sampling control unit, so that an operation is simple and applicability is high.

Figure 7:
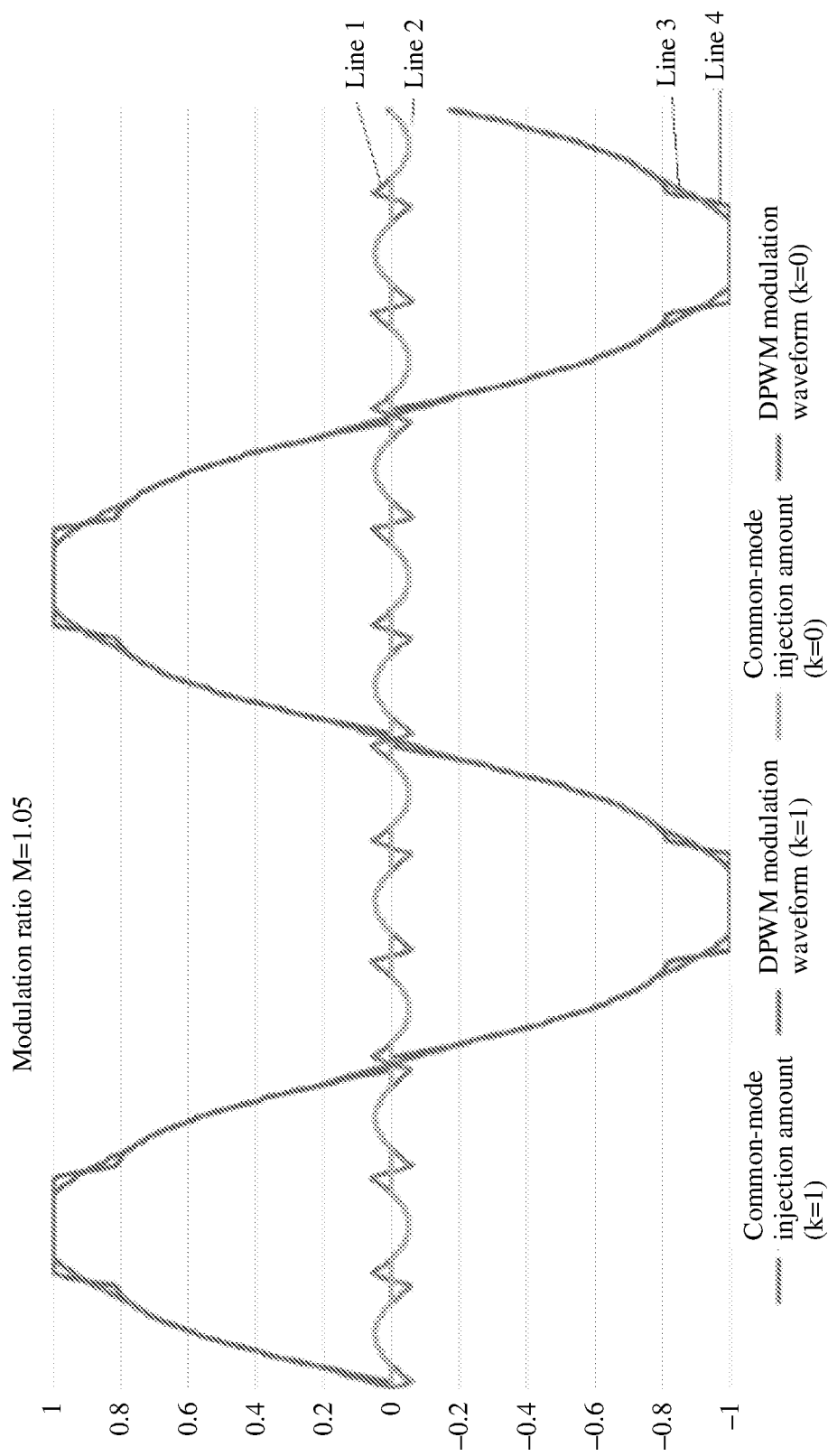
FIG. 7 is a schematic waveform diagram of pulse width modulated signals and common-mode voltages input into the pulse width modulated signals.

FIG. 7 is a schematic waveform diagram of pulse width modulated signals and common-mode voltages input into the pulse width modulated signals. In the schematic waveform diagram shown in FIG. 7, the modulation ratio M for pulse width modulation of the photovoltaic inverter may be 1.05 (1.05 may be an experimental value, or M may be another experimental value greater than 1; M may be determined based on an actual application scenario and is not limited herein). In this case, a line 1 represents a waveform of the common-mode injection amount (namely, the injection amount of the common-mode voltage) when the common-mode injection coefficient k of the pulse width modulated signal is adjusted to 1 in case of the modulation ratio M being 1.05. A line 2 represents a waveform of the common-mode injection amount when the common-mode injection coefficient k of the pulse width modulated signal is adjusted to 0 in case of the modulation ratio M being 1.05. A line 3 represents a DPWM modulation waveform (that is, a modulation waveform when the pulse width modulated signal is a DPWM signal) when the common-mode injection coefficient k of the pulse width modulated signal is adjusted to 0 in case of the modulation ratio M being 1.05. A line 4 represents a DPWM modulation waveform (that is, a modulation waveform when the pulse width modulated signal is a DPWM signal) when the common-mode injection coefficient k of the pulse width modulated signal is adjusted to 1 in case of the modulation ratio M being 1.05.

Figure 8:
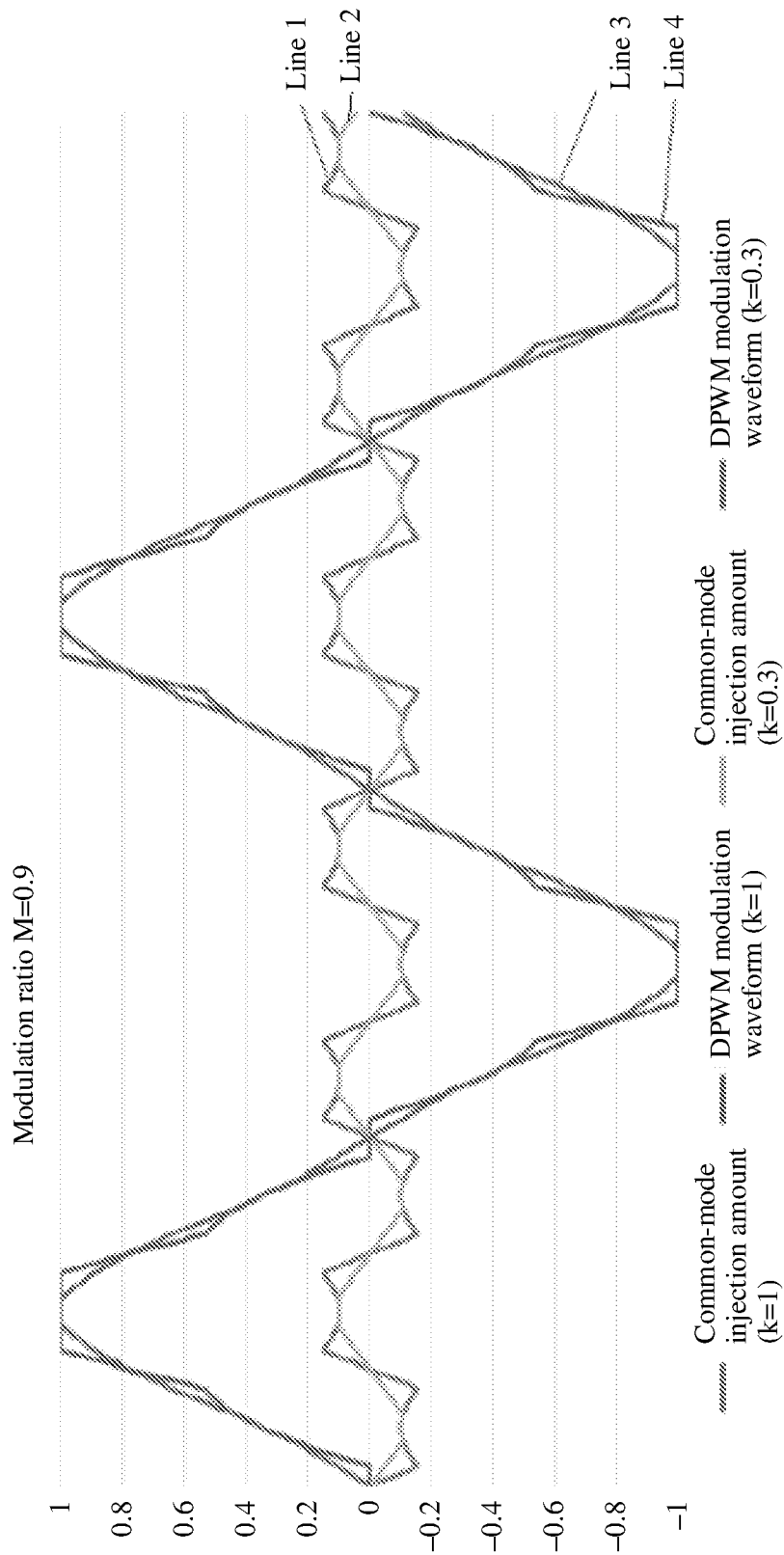
FIG. 8 is another schematic waveform diagram of pulse width modulated signals and common-mode voltages input into the pulse width modulated signals.

FIG. 8 is another schematic waveform diagram of pulse width modulated signals and common-mode voltages input into the pulse width modulated signals. In the schematic waveform diagram shown in FIG. 8, the modulation ratio M for pulse width modulation of the photovoltaic inverter may be 0.9 (0.9 may be an experimental value, or M may be another experimental value less than or equal to 1; M may be determined based on an actual application scenario and is not limited herein). In this case, a line 1 represents a waveform of the common-mode injection amount (namely, the injection amount of the common-mode voltage) when the common-mode injection coefficient k of the pulse width modulated signal is adjusted to 1 in case of the modulation ratio M being 0.9. A line 2 represents a waveform of the common-mode injection amount when the common-mode injection coefficient k of the pulse width modulated signal is adjusted to 0.3 in case of the modulation ratio M being 0.9. A line 3 represents a DPWM modulation waveform (that is, a modulation waveform when the pulse width modulated signal is a DPWM signal) when the common-mode injection coefficient k of the pulse width modulated signal is adjusted to 0.3 in case of the modulation ratio M being 0.9. A line 4 represents a DPWM modulation waveform (that is, a modulation waveform when the pulse width modulated signal is a DPWM signal) when the common-mode injection coefficient k of the pulse width modulated signal is adjusted to 1 in case of the modulation ratio M being 0.9. It can be learned from the waveform diagram shown in FIG. 7 or FIG. 8 that, when the modulation ratios for the pulse width modulated signals of the photovoltaic inverter are the same and the common-mode injection coefficients are different, the waveforms of the pulse width modulated signals of the photovoltaic inverter are also different. The smaller the common-mode injection coefficient, the more the waveform of the pulse width modulated signal is close to a smooth sinusoidal curve. In other words, the smaller the common-mode injection coefficient, the more the three-phase modulated wave obtained after the common-mode voltage injection is close to the three-phase sinusoidal modulated wave before the common-mode voltage is superimposed, that is, the smaller the common-mode voltage in the pulse width modulated signal. Therefore, the sampling control unit may reduce the common-mode injection coefficient of the pulse width modulated signal of the photovoltaic inverter to reduce the injection amount of the common-mode voltage in the pulse width modulated signal. Herein, the common-mode injection amount in the pulse width modulated signal of the photovoltaic inverter can be effectively reduced by reducing the common-mode injection coefficient of the pulse width modulated signal of the photovoltaic inverter. While the leakage current is suppressed, the photovoltaic system can still work in a working mode of a current pulse width modulation policy, that is, adjusting the common-mode injection amount does not affect the modulation ratio of the photovoltaic inverter. This can reduce a loss of a power generation capacity of the photovoltaic system.

In some feasible implementations, it can be learned from the waveform diagrams shown in FIG. 7 and FIG. 8 that, when the modulation ratios for the pulse width modulated signals of the photovoltaic inverter are different and the common-mode injection coefficients are different, the common-mode injection amounts in the pulse width modulated signals of the photovoltaic inverter are also different, so that the waveforms of the pulse width modulated signals of the photovoltaic inverter are also different. As shown in FIG. 8, in a scenario in which the modulation ratio M is less than or equal to 1, as the common-mode injection coefficient k decreases, the common-mode injection amount of the photovoltaic inverter also decreases. It can be understood that, when the common-mode injection coefficient decreases to 0, the common-mode injection amount of the photovoltaic inverter is minimal and the photovoltaic system is in a minimum leakage current condition in this case. When it is detected that the current value of the leakage current of the photovoltaic system is greater than the current threshold and the modulation ratio for the pulse width modulation of the photovoltaic inverter is less than or equal to 1, the sampling control unit may reduce the common-mode injection coefficient of the pulse width modulated signal of the photovoltaic inverter until the common-mode injection coefficient is 0. In other words, in the scenario in which the modulation ratio for the pulse width modulation of the photovoltaic inverter is less than or equal to 1, for example, the pulse width modulation of the photovoltaic inverter being SPWM, the sampling control unit may reduce the common-mode injection coefficient of the pulse width modulated signal of the photovoltaic inverter to 0 when detecting that the current value of the leakage current is greater than the current threshold. In this case, the injection amount of the common-mode voltage (also referred to as the common-mode injection amount) in the pulse width modulated signal of the photovoltaic inverter is minimum, the photovoltaic system is in the minimum leakage current condition, an operation is simple, and the modulation ratio of the photovoltaic inverter is not affected. In this way, the bus utilization of the photovoltaic inverter (the bus utilization is a ratio of an output voltage of the photovoltaic inverter to a bus voltage) can be prevented from being reduced, power generation efficiency of the photovoltaic system can be ensured, working stability of the photovoltaic system can be ensured, and applicability is high.

In some feasible implementations, as shown in FIG. 7, in a scenario in which the modulation ratio M is greater than 1, after the common-mode injection coefficient decreases to 0, the photovoltaic inverter still has a common-mode injection amount to ensure the pulse width modulation effect of the photovoltaic inverter. When the modulation ratio of the photovoltaic inverter is greater than 1, the sampling control unit may reduce the common-mode injection coefficient of the pulse width modulated signal of the photovoltaic inverter to reduce the injection amount of the common-mode voltage in the pulse width modulated signal, until the common-mode injection coefficient is 0 and/or the detected current value of the leakage current is less than or equal to the current threshold. In other words, in the scenario in which the modulation ratio for the pulse width modulation of the photovoltaic inverter is greater than 1, for example, the pulse width modulation of the photovoltaic inverter being DPWM, the sampling control unit may also reduce the common-mode injection coefficient of the pulse width modulated signal of the photovoltaic inverter to 0 when detecting that the current value of the leakage current is greater than the current threshold. In this case, the pulse width modulated signal of the photovoltaic inverter still includes a common-mode injection amount to ensure a DPWM modulation effect of the photovoltaic system and reduce the leakage current of the photovoltaic system without affecting the modulation ratio of the photovoltaic inverter. In this way, the bus utilization of the photovoltaic inverter can be prevented from being reduced, power generation efficiency of the photovoltaic system can be ensured, working stability of the photovoltaic system can be ensured, and applicability is high. In addition, when the modulation ratio of the photovoltaic inverter is greater than 1, if detecting that the current value of the leakage current is greater than the current threshold after reducing the common-mode injection coefficient to 0, the sampling control unit may adjust the modulation ratio for the pulse width modulation of the photovoltaic inverter to be less than or equal to 1 (for example, adjust the pulse width modulation policy of the photovoltaic inverter to SPWM, and in this case, the common-mode voltage is not injected into the pulse width modulated signal of the photovoltaic inverter). In this case, the photovoltaic system is in a minimum leakage current condition. When the modulation ratio for the pulse width modulation used by the sampling control unit to modulate the photovoltaic inverter is less than or equal to 1, the common-mode voltage may not be injected into the pulse width modulated signal of the photovoltaic inverter. In this case, the photovoltaic system may be controlled to be in the minimum leakage current condition. This is simple in operation and high in applicability.

Optionally, in some feasible implementations, when adjusting the modulation ratio for the pulse width modulation of the photovoltaic inverter from being greater than 1 to being less than or equal to 1, the sampling control unit may directly switch the modulation policy for the pulse width modulation of the photovoltaic inverter, for example, switch the modulation policy for the pulse width modulation of the photovoltaic inverter from DPWM to SPWM, so that the modulation ratio for the pulse width modulation of the photovoltaic inverter is less than or equal to 1. In this case, the common-mode voltage is not injected into the pulse width modulated signal of the photovoltaic inverter, and the photovoltaic system is in the minimum leakage current condition. This is simple in operation.

The sampling control unit may adjust the common-mode injection amount in the pulse width modulated signal of the photovoltaic inverter and/or the modulation ratio of the photovoltaic inverter based on the leakage current value detected in real time, and may smoothly adjust the common-mode injection amount in the pulse width modulated signal of the photovoltaic inverter by gradually reducing the common-mode injection coefficient, thereby adaptively adjusting the leakage current of the photovoltaic inverter. The modulation ratio of the photovoltaic inverter can be kept unchanged while controlling the leakage current. In this way, the bus utilization of the photovoltaic inverter can be prevented from being reduced, the power generation loss of the photovoltaic inverter can be minimized, and the pulse width modulation effect of the photovoltaic system can be ensured. This is simple in operation and high in applicability. When the modulation ratio of the photovoltaic inverter is greater than 1, if detecting that the current value of the leakage current is greater than the current threshold after reducing the common-mode injection coefficient to 0, the sampling control unit may adjust the modulation ratio for the pulse width modulation of the photovoltaic inverter to be less than or equal to 1. In this case, the common-mode voltage may not be injected into the pulse width modulated signal of the photovoltaic inverter, and the photovoltaic system may be controlled to be in the minimum leakage current condition. This is simple in operation and high in applicability.

Figure 9:
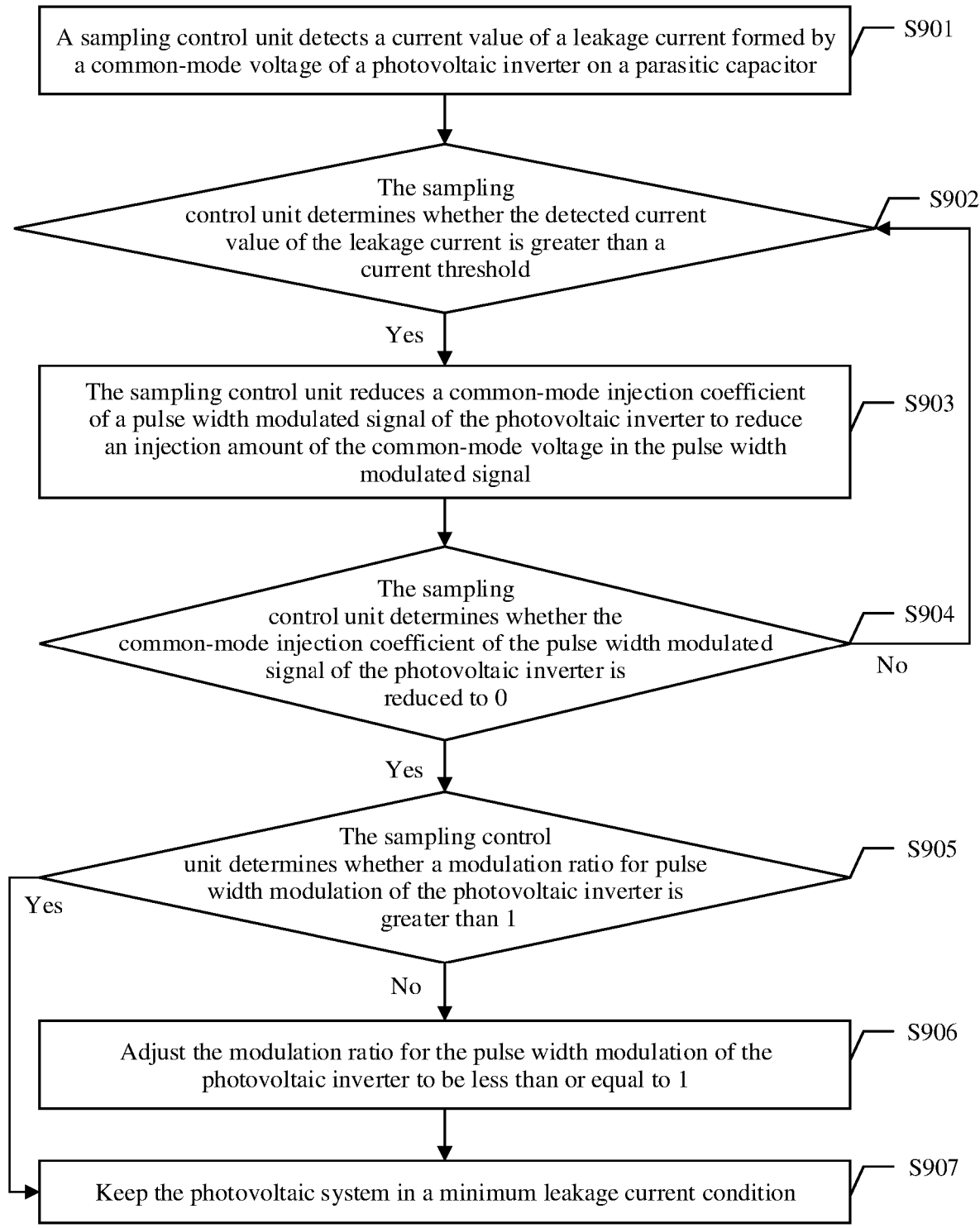
FIG. 9 is a schematic flowchart of a leakage current control method for a photovoltaic system.

FIG. 9 is a schematic flowchart of a leakage current control method for a photovoltaic system. The schematic flowchart is applicable to the sampling control unit in the photovoltaic systems provided in FIG. 1 to FIG. 5. In the foregoing photovoltaic systems, a parasitic capacitor exists between a photovoltaic module group and a grounded metal frame. The method includes the following steps.

S901: The sampling control unit detects a current value of a leakage current formed by a common-mode voltage of a photovoltaic inverter on the parasitic capacitor.

In some feasible implementations, the sampling control unit may detect the current value of a common-mode circuit in the photovoltaic system in real time, to monitor, in real time, the current value of the leakage current formed by the common-mode voltage of the photovoltaic inverter in the photovoltaic system on the parasitic capacitor. Optionally, in a working process of the photovoltaic inverter (for example, in a process in which the photovoltaic inverter is connected to an alternating current power grid and provides electrical energy for the alternating current power grid), the sampling control unit may detect, in real time, the leakage current in the common-mode circuit that is in the photovoltaic system shown in FIG. 3 and that is formed among the parasitic capacitor-the photovoltaic module group-the photovoltaic inverter-power grid, to detect the leakage current of the photovoltaic system. Alternatively, in a working process of the photovoltaic inverter, the sampling control unit may detect, in real time, the leakage current in the common-mode circuits to the ground that are in the photovoltaic system shown in FIG. 5 and that are formed among the photovoltaic module groups of the n photovoltaic module groups and the n photovoltaic inverters, to detect the leakage current of the photovoltaic system. For example, in the working process of the photovoltaic inverter, the sampling control unit may detect, in real time, the leakage current in the common-mode circuit that is in the photovoltaic system shown in FIG. 5 and that is formed among the parasitic capacitor 1 (including the grounded metal frame and the parasitic capacitor 1)—the photovoltaic module group 1—the photovoltaic inverter 1—the photovoltaic inverter 2—the photovoltaic module group 2—the parasitic capacitor 2 (including the grounded metal frame and the parasitic capacitor 2), to detect the leakage current of the photovoltaic system. This may be determined based on an actual application scenario and is not limited herein.

S902: The sampling control unit determines whether the detected current value of the leakage current is greater than a current threshold and performs step S903 if a determining result is yes.

S903: The sampling control unit reduces a common-mode injection coefficient of a pulse width modulated signal of the photovoltaic inverter to reduce an injection amount of the common-mode voltage in the pulse width modulated signal.

In some feasible implementations, the sampling control unit may determine in real time whether the detected current value of the leakage current is greater than the current threshold; and may adjust the injection amount of the common-mode voltage in the pulse width modulated signal of the photovoltaic inverter based on the detected current value of the leakage current if the determining result is yes, to reduce the leakage current. Optionally, in a process in which the sampling control unit adjusts the injection amount of the common-mode voltage in the pulse width modulated signal of the photovoltaic inverter based on the detected current value, if the current value is greater than the current threshold, the common-mode injection coefficient of the pulse width modulated signal of the photovoltaic inverter may be reduced to reduce the injection amount of the common-mode voltage in the pulse width modulated signal. The injection amount of the common-mode voltage in the pulse width modulated signal of the photovoltaic inverter can be changed by adjusting the common-mode injection coefficient of the pulse width modulated signal of the photovoltaic inverter, so that an operation is simple and applicability is high. In addition, in a process in which the sampling control unit adjusts the injection amount of the common-mode voltage in the pulse width modulated signal of the photovoltaic inverter based on the current value of the leakage current, the sampling control unit can keep a modulation ratio of the photovoltaic inverter unchanged while controlling the leakage current. In this way, bus utilization of the photovoltaic inverter can be prevented from being reduced, a power generation loss of the photovoltaic inverter can be minimized, and a pulse width modulation effect of the photovoltaic system can be ensured. This is simple in operation and high in applicability.

S904: The sampling control unit determines whether the common-mode injection coefficient of the pulse width modulated signal of the photovoltaic inverter is reduced to zero and performs step S905 if a determining result is yes; otherwise, performs step S902.

In some feasible implementations, it can be learned from the waveform diagrams shown in FIG. 7 and FIG. 8 that, when the modulation ratios for the pulse width modulated signals of the photovoltaic inverter are different and the common-mode injection coefficients are different, the common-mode injection amounts in the pulse width modulated signals of the photovoltaic inverter are also different, so that the waveforms of the pulse width modulated signals of the photovoltaic inverter are also different. As the common-mode injection coefficient k decreases, the common-mode injection amount of the photovoltaic inverter also decreases. The sampling control unit may gradually decrease the common-mode injection coefficient of the pulse width modulated signal of the photovoltaic inverter based on the detected current value of the leakage current, until the current value of the leakage current is less than or equal to the current threshold or the common-mode injection coefficient of the pulse width modulated signal of the photovoltaic inverter is reduced to 0.

S905: The sampling control unit determines whether the modulation ratio for pulse width modulation of the photovoltaic inverter is greater than one and performs step S906 if a determining result is yes; otherwise, performs step S907.

S906: Adjust the modulation ratio for the pulse width modulation of the photovoltaic inverter to be less than or equal to 1.

S907: Keep the photovoltaic system in a minimum leakage current condition.

In some feasible implementations, as shown in FIG. 8, in a scenario in which the modulation ratio M is less than or equal to 1, it can be understood that, when the common-mode injection coefficient decreases to 0, the common-mode injection amount of the photovoltaic inverter is minimum and the photovoltaic system is in a minimum leakage current condition in this case. When it is detected that the current value of the leakage current of the photovoltaic system is greater than the current threshold and the modulation ratio for the pulse width modulation of the photovoltaic inverter is less than or equal to 1, the sampling control unit may reduce the common-mode injection coefficient of the pulse width modulated signal of the photovoltaic inverter until the common-mode injection coefficient is 0. In other words, in the scenario in which the modulation ratio for the pulse width modulation of the photovoltaic inverter is less than or equal to 1, for example, the pulse width modulation of the photovoltaic inverter being SPWM, the sampling control unit may reduce the common-mode injection coefficient of the pulse width modulated signal of the photovoltaic inverter to 0 when detecting that the current value of the leakage current is greater than the current threshold. In this case, the injection amount of the common-mode voltage (also referred to as the common-mode injection amount) in the pulse width modulated signal of the photovoltaic inverter is minimum, the photovoltaic system is in the minimum leakage current condition, an operation is simple, and the modulation ratio of the photovoltaic inverter is not affected. In this way, the bus utilization of the photovoltaic inverter (the bus utilization is a ratio of an output voltage of the photovoltaic inverter to a bus voltage) can be prevented from being reduced, power generation efficiency of the photovoltaic system can be ensured, working stability of the photovoltaic system can be ensured, and applicability is high.

In some feasible implementations, in a scenario in which the modulation ratio M is greater than 1, after the common-mode injection coefficient decreases to 0, the photovoltaic inverter still has a common-mode injection amount to ensure the pulse width modulation effect of the photovoltaic inverter. When the modulation ratio of the photovoltaic inverter is greater than 1, the sampling control unit may reduce the common-mode injection coefficient of the pulse width modulated signal of the photovoltaic inverter to reduce the injection amount of the common-mode voltage in the pulse width modulated signal, until the common-mode injection coefficient is 0 and/or the detected current value of the leakage current is less than or equal to the current threshold. In other words, in the scenario in which the modulation ratio for pulse width modulation of the photovoltaic inverter is greater than 1, for example, the pulse width modulation of the photovoltaic inverter being DPWM, the sampling control unit may also reduce the common-mode injection coefficient of the pulse width modulated signal of the photovoltaic inverter to 0 when detecting that the current value of the leakage current is greater than the current threshold. In this case, the pulse width modulated signal of the photovoltaic inverter still includes a common-mode injection amount to ensure a DPWM modulation effect of the photovoltaic system and reduce the leakage current of the photovoltaic system without affecting the modulation ratio of the photovoltaic inverter. In this way, the bus utilization of the photovoltaic inverter can be prevented from being reduced, power generation efficiency of the photovoltaic system can be ensured, working stability of the photovoltaic system can be ensured, and applicability is high. In addition, when the modulation ratio of the photovoltaic inverter is greater than 1, if detecting that the current value of the leakage current is greater than the current threshold after reducing the common-mode injection coefficient to 0, the sampling control unit may adjust the modulation ratio for the pulse width modulation of the photovoltaic inverter to be less than or equal to 1. For example, the sampling control unit switches a modulation policy for the pulse width modulation of the photovoltaic inverter from DPWM to SPWM, so that the modulation ratio for the pulse width modulation of the photovoltaic inverter is less than or equal to 1. In this case, the common-mode voltage is not injected into the pulse width modulated signal of the photovoltaic inverter, and the photovoltaic system is in a minimum leakage current condition. In this case, the common-mode voltage may not be injected into the pulse width modulated signal of the photovoltaic inverter, and the photovoltaic system is in the minimum leakage current condition. When the modulation ratio for the pulse width modulation used by the sampling control unit to modulate the photovoltaic inverter is less than or equal to 1, the common-mode voltage may not be injected into the pulse width modulated signal of the photovoltaic inverter. In this case, the photovoltaic system may be controlled to be in the minimum leakage current condition. This is simple in operation and high in applicability.

The sampling control unit may adjust the common-mode injection amount in the pulse width modulated signal of the photovoltaic inverter and/or the modulation ratio of the photovoltaic inverter based on the leakage current value detected in real time, and may smoothly adjust the common-mode injection amount in the pulse width modulated signal of the photovoltaic inverter by gradually reducing the common-mode injection coefficient, thereby adaptively adjusting the leakage current of the photovoltaic inverter. The sampling control unit can keep the modulation ratio of the photovoltaic inverter unchanged while controlling the leakage current. In this way, the bus utilization of the photovoltaic inverter can be prevented from being reduced, the power generation loss of the photovoltaic inverter can be minimized, and the pulse width modulation effect of the photovoltaic system can be ensured. This is simple in operation and high in applicability. In the scenario in which the modulation ratio of the photovoltaic inverter is greater than 1, if detecting that the current value of the leakage current is greater than the current threshold after reducing the common-mode injection coefficient to 0, the sampling control unit may adjust the modulation ratio for the pulse width modulation of the photovoltaic inverter to be less than or equal to 1. In this case, the common-mode voltage may not be injected into the pulse width modulated signal of the photovoltaic inverter, and the photovoltaic system may be controlled to be in the minimum leakage current condition. This is simple in operation and high in applicability.

What is claimed is:

1. A photovoltaic system comprising:
   at least one photovoltaic module group;
   at least one photovoltaic inverter;
   a grounded metal frame; and
   a sampling control unit, wherein the at least one photovoltaic module group is mounted on the grounded metal frame, an output end of the at least one photovoltaic module group is connected to an input end of the at least one photovoltaic inverter, an output end of the at least one photovoltaic inverter is connected to a power grid, the sampling control unit is coupled to both the at least one photovoltaic module group and the at least one photovoltaic inverter, and is configured to:
   detect a current value of a leakage current formed by a common-mode voltage of the at least one photovoltaic inverter on a parasitic capacitor, wherein the parasitic capacitor exists between the at least one photovoltaic module group and the grounded metal frame;
   adjust an injection amount of the common-mode voltage in a pulse width modulated signal of the at least one photovoltaic inverter based on the detected current value of the leakage current to reduce the leakage current;
   when detecting that the current value of the leakage current is greater than a current threshold, reduce a common-mode injection coefficient of the pulse width modulated signal of the at least one photovoltaic inverter to reduce the injection amount of the common-mode voltage in the pulse width modulated signal; and
   when a modulation ratio for pulse width modulation of the at least one photovoltaic inverter is less than or equal to one, reduce the common-mode injection coefficient of the pulse width modulated signal of the at least one photovoltaic inverter until the common-mode injection coefficient is zero.

2. The photovoltaic system according to claim 1, wherein the sampling control unit is further configured to:
   when the modulation ratio of the at least one photovoltaic inverter is greater than one, reduce the common-mode injection coefficient of the pulse width modulated signal of the at least one photovoltaic inverter to reduce the injection amount of the common-mode voltage in the pulse width modulated signal, until the common-mode injection coefficient is zero and/or the detected current value of the leakage current is less than or equal to the current threshold.

3. The photovoltaic system according to claim 2, wherein the sampling control unit is further configured to:
   when reducing the common-mode injection coefficient to zero and detecting that the current value of the leakage current is greater than the current threshold, adjust the modulation ratio for the pulse width modulation of the at least one photovoltaic inverter to be less than or equal to one.

4. The photovoltaic system according to claim 3, wherein the sampling control unit is further configured to:
   switch a modulation policy for the pulse width modulation of the at least one photovoltaic inverter, and
   adjust the modulation ratio for the pulse width modulation of the at least one photovoltaic inverter to be less than or equal to one.

5. The photovoltaic system according to claim 1, further comprising:
   at least two photovoltaic module groups; and
   at least two photovoltaic inverters, output ends of the at least two photovoltaic inverters are connected in parallel to the power grid, the at least two photovoltaic module groups and the at least two photovoltaic inverters form common-mode circuits to the grounded metal frame, and the sampling control unit is further configured to:
   detect the current value of the leakage current formed by common-mode voltages of the at least two photovoltaic inverters based on the current values to reduce the leakage current, and
   adjust injection amounts of the common-mode voltages in pulse width modulated signals of the at least two photovoltaic inverters based on the current value to reduce the leakage current.

6. The photovoltaic system according to claim 1, wherein the sampling control unit is integrated into the at least one photovoltaic inverter.

7. The photovoltaic system according to claim 1, wherein the at least one photovoltaic inverter further comprises:
   a DC/DC conversion module;
   an energy storage module; and
   a DC/AC conversion module, wherein an input end of the DC/DC conversion module is used as the input end of the at least one photovoltaic inverter, an output end of the DC/DC conversion module is connected to an input end of the DC/AC conversion module through the energy storage module, and an output end of the DC/AC conversion module is used as the output end of the at least one photovoltaic inverter.

8. The photovoltaic system according to claim 1, wherein the at least one photovoltaic inverter is a DC/AC conversion module, and the photovoltaic system further comprises:
   an energy storage module, wherein the output end of the at least one photovoltaic module group is connected to an input end of the DC/AC conversion module through the energy storage module, and an output end of the DC/AC conversion module is used as the output end of the at least one photovoltaic inverter.

9. The photovoltaic system according to claim 1, wherein the at least one photovoltaic module group comprises a plurality of photovoltaic strings that are connected in parallel, and a parallel connection end of the plurality of photovoltaic strings is used as the output end of the at least one photovoltaic module group.

10. A method for controlling a leakage current in a photovoltaic system, wherein the method is applicable to the sampling control unit and a parasitic capacitor exists between the at least one photovoltaic module group and the grounded metal frame, the method comprising:
   detecting, by the sampling control unit, a current value of a leakage current formed by a common-mode voltage of the at least one photovoltaic inverter on the parasitic capacitor;
   adjusting, by the sampling control unit, an injection amount of the common-mode voltage in a pulse width modulated signal of the at least one photovoltaic inverter based on the detected current value of the leakage current to reduce the leakage current;

when the current value is greater than a current threshold, reducing a common-mode injection coefficient of the pulse width modulated signal of the at least one photovoltaic inverter to reduce the injection amount of the common-mode voltage in the pulse width modulated signal; and when a modulation ratio for pulse width modulation of the at least one photovoltaic inverter is less than or equal to one, reducing the common-mode injection coefficient of the pulse width modulated signal of the at least one photovoltaic inverter until the common-mode injection coefficient is zero.

11. The method according to claim 10, wherein reducing the common-mode injection coefficient of the pulse width modulated signal of the at least one photovoltaic inverter further comprises:

when a modulation ratio of the at least one photovoltaic inverter is greater than one, reducing the common-mode injection coefficient of the pulse width modulated signal of the at least one photovoltaic inverter until the common-mode injection coefficient is zero and/or the detected current value of the leakage current is less than or equal to the current threshold.

12. The method according to claim 11, further comprising:

when reducing the common-mode injection coefficient to zero and detecting that the current value of the leakage current is greater than the current threshold, adjusting, by the sampling control unit, the modulation ratio for the pulse width modulation of the at least one photovoltaic inverter to be less than or equal to one.

13. The method according to claim 12, wherein adjusting the modulation ratio for the pulse width modulation of the at least one photovoltaic inverter to be less than or equal to one further comprises:

switching a modulation policy for the pulse width modulation of the at least one photovoltaic inverter, to adjust the modulation ratio for the pulse width modulation of the at least one photovoltaic inverter to be less than or equal to one.

\* \* \* \* \*